United States Patent
Shachaf et al.

(10) Patent No.: US 12,353,407 B1
(45) Date of Patent: Jul. 8, 2025

(54) SYSTEM AND METHOD FOR ARTIFICIAL INTELLIGENCE BASED GENERATION OF DATABASE QUERIES

(71) Applicant: NICE LTD., Ra'anana (IL)

(72) Inventors: Yuval Shachaf, Tzur Moshe (IL); Rami Tibi Abu Rass, Taybeh (IL); Omer Kuleski, Petah-Tikva (IL); Gal Tesler, Hoboken, NJ (US)

(73) Assignee: NICE LTD., Ra'anana (IL)

(*) Notice: Subject to any disclaimer, the term of this patent is extended or adjusted under 35 U.S.C. 154(b) by 0 days.

(21) Appl. No.: 18/408,818

(22) Filed: Jan. 10, 2024

(51) Int. Cl.
  *G06F 16/242* (2019.01)
  *G06F 16/2455* (2019.01)

(52) U.S. Cl.
  CPC ........ *G06F 16/243* (2019.01); *G06F 16/2455* (2019.01)

(58) Field of Classification Search
  CPC ............................ G06F 16/243; G06F 16/2455
  USPC ......................................................... 707/769
  See application file for complete search history.

(56) References Cited

U.S. PATENT DOCUMENTS

| | | | |
|---|---|---|---|
| 10,607,141 B2* | 3/2020 | Jerram | G10L 15/08 |
| 11,599,532 B1* | 3/2023 | Khan | G06F 16/21 |
| 11,931,894 B1* | 3/2024 | Rose | B25J 9/1671 |
| 2017/0339150 A1* | 11/2017 | Barsness | G06F 21/6209 |
| 2024/0152515 A1* | 5/2024 | Antoun | G06F 16/24575 |
| 2024/0242154 A1* | 7/2024 | Jindal | G06Q 10/0637 |
| 2024/0265205 A1* | 8/2024 | Goligorsky | G06F 40/205 |
| 2024/0273291 A1* | 8/2024 | Smith | G06F 40/279 |
| 2024/0281668 A1* | 8/2024 | Lev | G06F 40/247 |
| 2024/0303235 A1* | 9/2024 | Kulkarni | G06F 16/24522 |
| 2025/0005523 A1* | 1/2025 | Katta | G06F 40/186 |

* cited by examiner

*Primary Examiner* — Kimberly L Wilson
(74) *Attorney, Agent, or Firm* — PEARL COHEN ZEDEK LATZER BARATZ LLP

(57) ABSTRACT

A system and method for automatic generation of database queries using zero-shot, context-based machine learning may output and/or execute database queries and/or analytics insights or plots based on text prompts, and may include or involve: wrapping a text prompt to include database structure information; generating, by a large language model (LLM), a query based on the wrapped prompt, where the query may include one or more database operations; and extracting data or information items from a database based on the query. Some embodiments may include additional prompt or query processing operations such as, e.g., wrapping queries to include corresponding database operations, validating that queries do not include malicious or undesirable commands, and automatically performing appropriate computer actions based on generated queries. Some embodiments of the invention may relate to databases and text prompts describing user actions input to a computer and collected by a desktop data collection software.

15 Claims, 19 Drawing Sheets

Query:

502 — SELECT TOP 3 DESKTOP_APPLICATION_SCD_DIM.DESKTOP_APPLICATION_LONG_NAME, SUM(DESKTOP_APPLICATION_ACTIVITY_FACT.DESKTOP_APPLICATION_ACTIVITY_DURATION_SECONDS) AS TOTAL_USED_TIME FROM AAN_REFINED.DESKTOP_APPLICATION_ACTIVITY_FACT INNER JOIN AAN_REFINED.DESKTOP_APPLICATION_SCD_DIM ON DESKTOP_APPLICATION_ACTIVITY_FACT.DESKTOP_APPLICATION_KEY= DESKTOP_APPLICATION_SCD_DIM.DESKTOP_APPLICATION_KEY GROUP BY DESKTOP_APPLICATION_SCD_DIM.DESKTOP_APPLICATION_LONG_NAME ORDER BY TOTAL_USED_TIME DESC;

Wrapped query:

504 — *given the query: {}, provide only the x and y axis for a plot and the plot type, the plot type can be bar, line or pie. the axis values are the column names. lowercase and underscore between words. in json format (xAxis, yAxis, type} - xAxis is the first column and yAxis is the second column.*

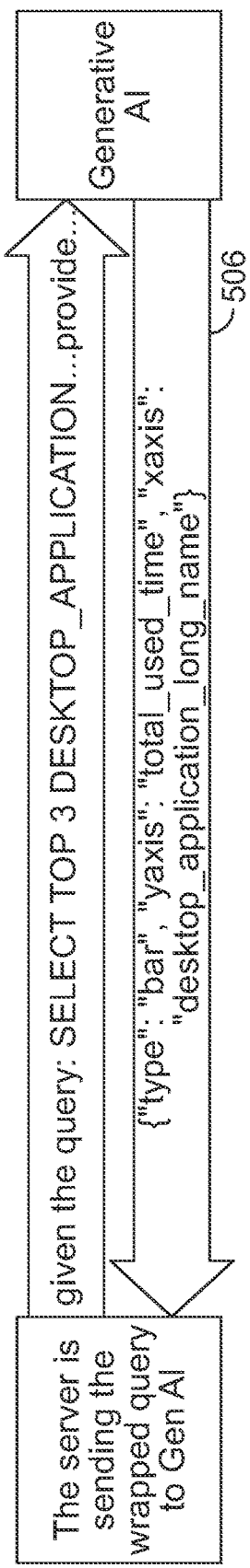

FIG. 5

SYSTEM AND METHOD FOR ARTIFICIAL INTELLIGENCE BASED GENERATION OF DATABASE QUERIES

FIELD OF THE INVENTION

The present invention relates generally to artificial intelligence assisted analysis of large volumes of data, and more particularly to the automatic generation of database queries and/or analytics plots using artificial intelligence tools and techniques.

BACKGROUND OF THE INVENTION

In the contemporary landscape of information management, the significance of big data analysis techniques is underscored by their transformative impact on decision-making processes and operational efficiencies. The burgeoning volume and complexity of digital data often requires sophisticated analytical tools and big data analysis techniques for, e.g., making decisions based on large volumes of data. Some such techniques enable the extraction of actionable insights from vast datasets, fostering a paradigm shift in industries ranging from finance to healthcare. Innovations in this field does not only enhance the accuracy of predictive modeling but also revolutionizes the way businesses and researchers approach data-driven challenges.

In the contexts of quality management (QM) and automation discovery, for example—desktop analytics tools are often used for collecting and analyzing, for example, millions of user actions and for uncovering processes productivity or efficiency deficiencies. This may allow organizations to optimize their operations and achieve substantial cost savings.

In such context, however, as well as in various different contexts where big data analytics may prove useful-users and organizations often struggle to harness the true potential of monitoring and using data describing their operational activity, primarily due to the technical expertise required for effective monitoring and insight generation (which may include, for example, familiarity with proprietary software, proficiency in structured query language, and the like). To maximize the value organizations can make out of large volumes of data such as, for example, rich desktop data, there is a need for ways for drawing insights from complex analyses of vast amounts of data that may require little to no technical expertise.

SUMMARY

Embodiments of the invention may automatically generate database queries using zero-shot, context-based machine learning methods and approaches, and may output and/or execute database queries based on input text prompts.

Some embodiments of the invention may wrap a text prompt to include database structure information; generate, by a large language model (LLM), a query based on the wrapped prompt, where the query may include one or more database operations; and extract data or information items from a database based on the query.

Some embodiments may include additional prompt or query processing operations such as, e.g., wrapping queries to include corresponding or appropriate database operations, validating that queries do not include malicious or undesirable commands, as well as automatically performing appropriate computer actions based on generated queries. Some embodiments of the invention may relate to databases and text prompts describing user actions input to a computer and collected by a desktop data collection software, although different embodiments of the invention may relate to different types of data and be integrated with various data management or monitoring components. Some embodiments may automatically generate analytics insights and plots such as, e.g., described herein.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

FIG. 5 shows an example query wrapping procedure according to some embodiments of the invention;

Figure 1:
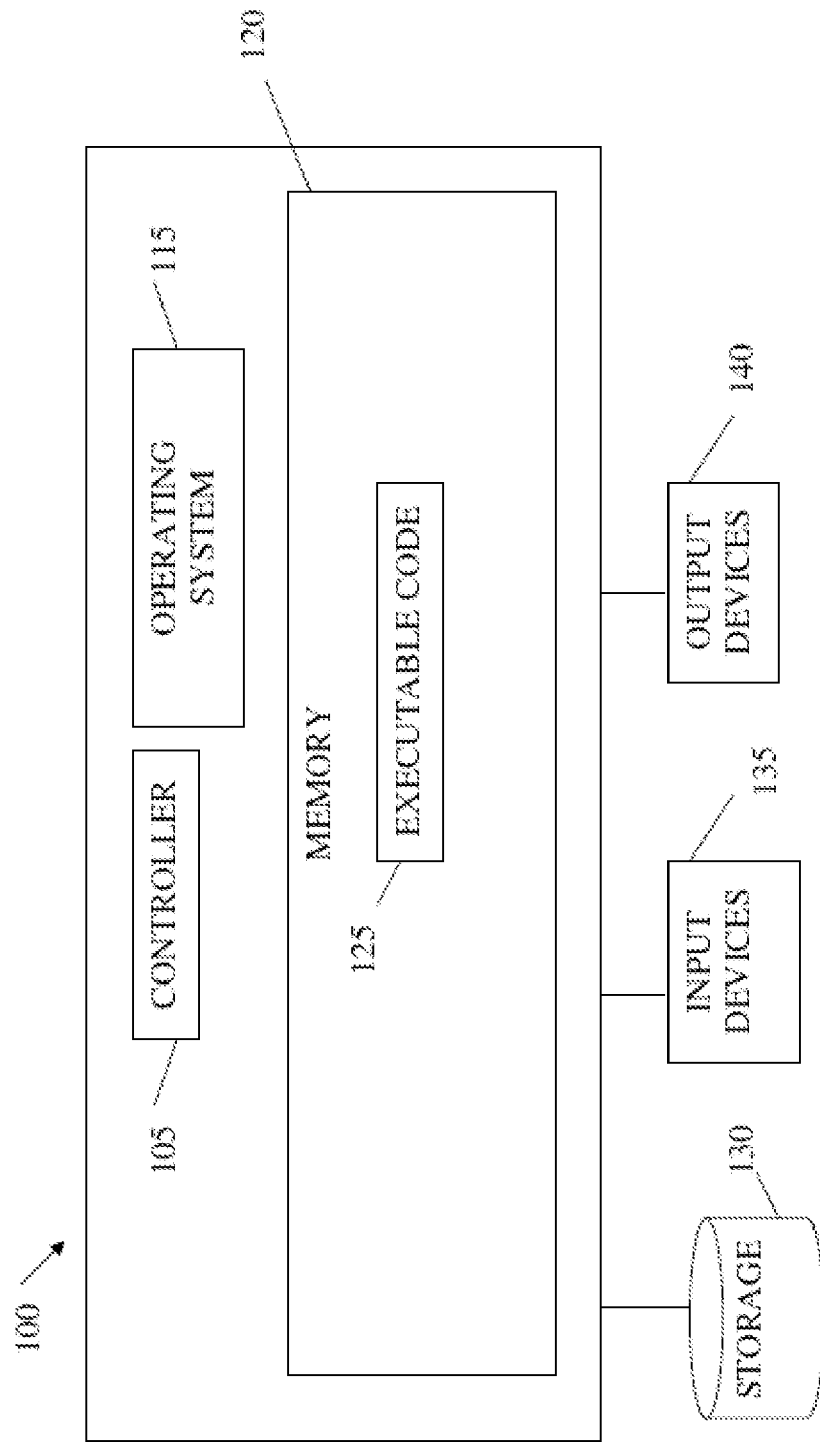
FIG. 1 is a high-level block diagram of an exemplary computing device which may be used with embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Embodiments may include or utilize generative completion models, generative artificial intelligence models (which may be referred to herein as "GenAI" models), or large language models (LLMs) to generate insights describing a dataset or database, or a plurality of datasets or databases—which may include for example vast amounts of data and may require complex database queries in a programming language such as for example structured query language (SQL) for data processing and plot generation. In some embodiments, and as further demonstrated herein, prompts and/or queries may include or describe database operations or commands, although additional or alternative prompts or queries may be used in different embodiments of the invention. Some embodiments may automatically create analytics widgets and/or plots or charts using machine learning or artificial intelligence techniques such as for example natural language based, zero-shot, in-context learning tools such as for example described herein. Embodiments may transform unstructured text inputs into valuable database queries, which may provide and present database insights in easy-to-understand, user-friendly widgets.

In zero-shot learning, no labeled data may be provided to a machine learning model (which may be for example a deep learning artificial neural network model) while the model may be used for solving an unfamiliar, or completely new problem by learning "contexts" on the fly. In some embodiments, and as described herein, the relevant prompts may have or may include approximate table and column names which may allow, for example, a generative AI model such as described herein to generate meaningful queries and/or metadata based on database schemas and/or names used as context information. Using generative AI models, some embodiments of the invention may allow producing database queries automatically, in a manner which allows providing desirable outputs for a great variety of natural language inputs which may not be "known" to the system (as opposed to, e.g., "classical", AI-free automation methods, which require well defined inputs).

Some embodiments of the invention may be applied for example in automation discovery contexts, to a contact center environment, for example as part of a quality management (QM) and action monitoring system such as for example the CXone platform or suite by NICE Ltd. (although additional or alternative platforms may be used in different embodiments of the invention). In such contexts, embodiments of the invention may be used for example to generate insights and/or plots based on, e.g., a database of user actions describing computer actions performed by a plurality of users or agents in a contact center. In some embodiments, a user action database or a plurality of databases may be constructed or generated using data collected from a desktop application or software (such as for example included in the Cxone platform by NICE Ltd.), which may monitor and document user actions input to a computer—and/or using additional or alternative data collection procedures as known in the art. Some insights and plots generated in automation discovery contexts are further provided as nonlimiting examples herein. One skilled in the art, however, will recognize that different embodiments of the invention may be used in different contexts, and/or may be embedded in different systems which may be unrelated to automation discovery and/or to contact center environments.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as low-level action data, output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

Some embodiments of the invention may include or use machine learning GenAI models or LLMs for example to generate or produce database queries from natural language and/or to generate or produce metadata for charts or insights such as for example described herein. Some nonlimiting example for GenAI model that may be used in some embodiments of the invention may be, e.g., the GPT3.5 or GPT4.0 LLMs by OpenAI, although additional or alternative GenAI models and techniques (including, e.g., various open source LLMs known in the art) may be used in different embodiments of the invention. In some embodiments, GenAI models may be provided on an external, 3rd party cloud platform, or running on a client platform such as for example a server as described herein which may, e.g., conform to the architecture of system 100 as described herein. In some embodiments, a plurality of machine learning models such as GenAI or LLMs may be used in different steps considered herein: for example, a first machine learning model may be used for producing a query based on a prompt, and a second machine learning model (which may be, e.g., separate and distinct from the first machine learning model) may be used for generating or producing chart metadata or metadata items based on a query such as for example described herein. One skilled in the art would recognize that various configurations and settings for implementing machine learning models, LLMs, or GenAI models in different embodiments of the invention may be realized.

In the context of the present document, a "user" may refer to a computer system which may for example conform to the architecture of system 100, and which may communicate with a physically separate or remote server (which may conform to the architecture of system 100 as well)—for example over a communication or data network and using communication protocols as known in the art. In some contexts, a "user" may refer to a human operating the computer system, for example using an appropriate input device, in order to communicate with the server (such as for example as part of generating and transmitting an insight request as further described herein).

It should be noted that a "server" as referred to herein may be for example a distributed computer system which may for example be implemented in a cloud platform, and which may not be found at a single physical location. One skilled in the art would recognize that various server configurations may be used in different embodiments of the invention.

Figure 2:
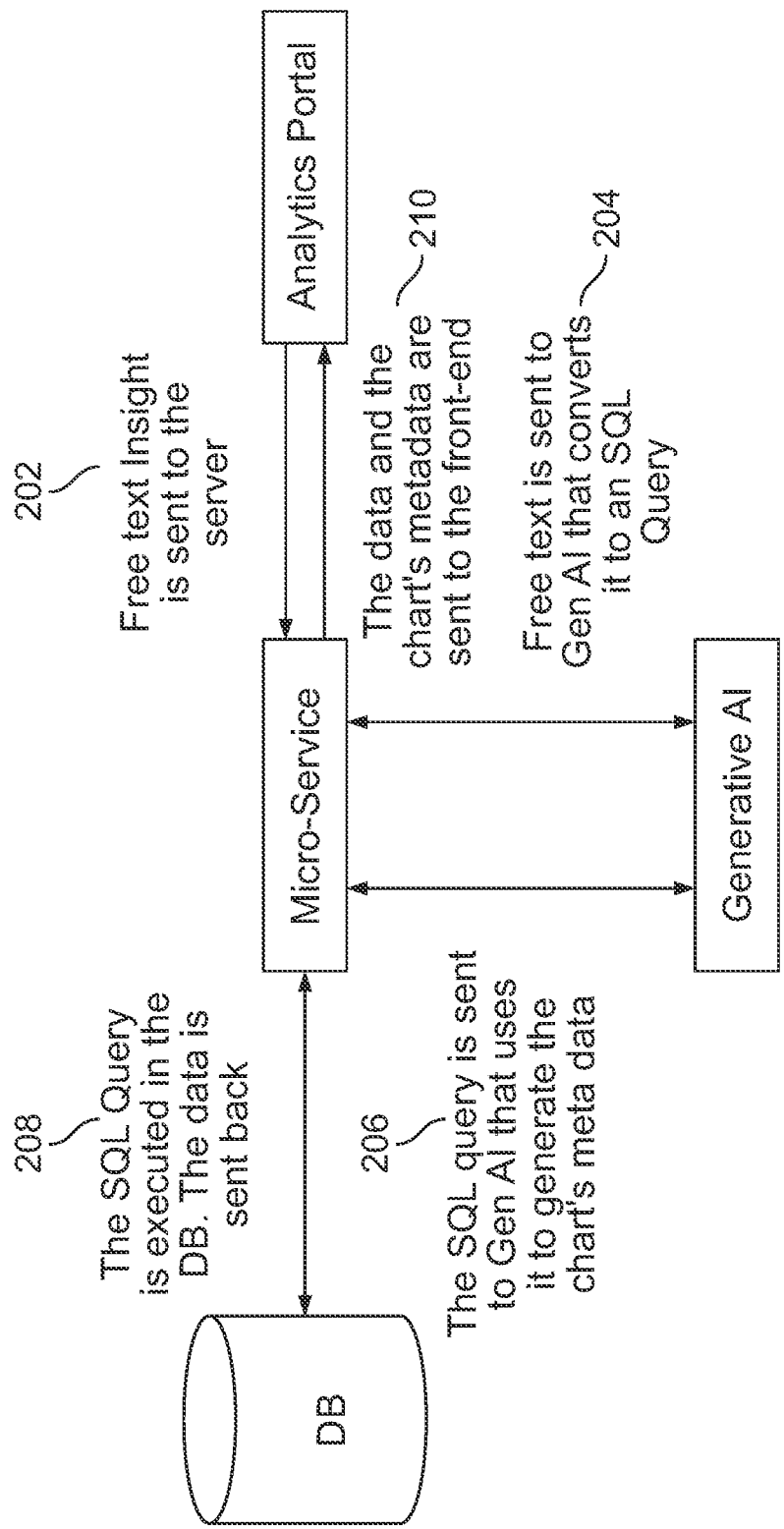
FIG. 2 shows an example system for artificial intelligence based generating of a database query according to some embodiments of the invention.

FIG. 2 shows an example system for artificial intelligence based generating of a database query according to some embodiments of the invention.

In some embodiments of the invention and as further described herein, a user may enter a free-text insight request into an appropriate user interface (UI) such as for example a text box in an analytics portal such as for example described herein, and click on a button to generate a graph widget, e.g., according to the various protocols and procedures described herein; The insight request may for example include a description of the desired information in which the user may be interested, such as "the top 10 most used applications" (or the ten most used applications among a plurality of users in a contact center environment, as may for example be described or documented in a database of user actions collected, e.g., using a desktop application as known in the art). The insight request may then be sent to the server 202, on which various protocols and procedures described herein may for example be implemented, for example, as a dedicated computer program, or as a plurality of programs or micro-services. In some embodiments, the insight request may be sent and/or received and processed as a HTTP POST request or webform with the insight request included in the body of the request or form, and/or using a representational state transfer (REST) protocol, and/or additional or alternative protocols or interfaces known in the art.

Embodiments may wrap a text prompt, where the wrapped prompt may include, for example, database structure information. In some embodiments, the server may "wrap" or contextualize the received request with a description string outlining the required output format from a GenAI model. In the context of the present document, "wrapping" or contextualizing may refer to embedding an input text or string, which may for example be received from a user as a prompt or insight request, in additional pieces of text or strings—for example in order to standardize the input text before it is being further input into a GenAI or LLM component such as for example described herein. In some embodiments of the invention, wrapping may be performed based on words or keywords stored in a dedicated database that may be selected and used if certain words are identified as being included in the input text or request, and/or may be preselected or preset based on various preferences (such as for example a particular SQL query or chart format which may be preferred in some embodiments of the invention and as further demonstrated herein). Nonlimiting example wrapped queries are further provided herein.

Embodiments may generate, by a large language model (LLM), a query based on the wrapped prompt, where the query may describe or include a plurality database operations or commands such as for example further described herein. In one example, a desired output from an LLM may be for example an SQL query including one or more SQL commands, which may for example select two columns from a database, which may be used to extract a plurality of data entries or data items from a database based on the query, and to create a graph displaying the information described in the user's insight request or prompt (in this context, see further example use cases herein) such as further described herein. Thus, some words, keywords, or phrases-which may describe selecting two columns and/or creating a graph or chart of a specific type (such as for example a bar graph)—may be selected by some embodiments of the invention and wrap the received used request prior to using GenaAI components such as for example described herein.

The server may maintain or store predetermined or "constant" or predefined strings that correspond to, e.g., database structure information and may describe database structures, table names, column names, and their respective types, and the like. In some embodiments, the server may send a plurality of strings, such as for example a constant string detailing the database structure (which may also be referred to herein as "schemas" or "database information") which may be included in, or attached to, a wrapped or contextualized prompt—to a GenAI model 204. In return, the server may receive the database query (which may be, e.g., an SQL query), as for example further described herein.

Embodiments may further wrap the query to include one or more instructions, the instructions corresponding a plurality of appropriate or desirable database operations or database commands. In some embodiments, database operations may include for example identifications of a chart type and/or of one or more axes or data displayed on one or more axes, such as, e.g., further demonstrated herein. Embodiments may generate, by a GenAI or LLM component, chart metadata or metadata items based on the wrapped query. In some embodiments, the server may use an additional string, or a "constant string", and may, for example, serve or be used as an additional prompt for GenAI to obtain settings or details for plotting a graph, which may be referred to herein as "chart metadata". Such a string may include, for example, a text format representation of the graph's axis names and type {xAxis, y Axis, type} (for example using the JSON format-although additional or alternative formats may be used in different embodiments). In this context, a database query (which may have been previously received from a GenAI model) may be wrapped or encapsulated in this constant string, and this prompt may then be sent to GenAI, which may then generate or provide the JSON details or chart metadata or metadata items in return and based on the wrapped query 206, such as, e.g., further demonstrated in various examples herein.

It should be noted that additional or alternative text, prompt, or request wrapping, formatting, and standardization protocols and procedures are known in the art and may be used in different embodiments of the invention.

Embodiments may extract data items from a database based on a generated or output query. Once an appropriate database query such as, e.g., an SQL query is received from a corresponding GenAI component, the query may be then executed in a relevant database 208, e.g., to extract or output data entries or data items from the database based on the query, and/or to retrieve the relevant data or result data matching or corresponding to the user's insight request as further described herein. As mentioned and further demonstrated herein, an output of a query may include data selected from two columns, which will later be used as the xAxis and yAxis in a chart or a graph.

Following, and for example based on the output generated using steps 202-208, the server may create a final text object (which may be in JSON format and referred to simply as a JSON object, although additional or alternative formats may be used in different embodiments) that may be sent back to the user, user interface, or front end 210 and that may be processed and displayed, for example, using a graph widget in a relevant web-based portal such as further demonstrated herein.

Before the SQL query may be executed in the database, some embodiments may verify that it does not contain certain forbidden keywords or commands such as for example: "DELETE FROM", "INSERT INTO", "DROP TABLE", "TRUNCATE TABLE", "ALTER TABLE", "CREATE TABLE", and the like. This may be done in order to prevent any deletions or changes to the database and/or undesirable losses of information or data. Some embodiments of the invention may only accept a particular kind of queries, such as for example "SELECT FROM" queries. In this context, nonlimiting example query verification procedures are further described herein.

In this context, in some embodiments, if the query includes one or more stop or "forbidden" commands, or if a count value exceeds or is larger than a predetermined threshold (see further description herein) an alert may be transmitted to a remote computer using, for example, communication protocols and alert or notification formats known in the art.

Embodiments may accordingly plot a chart on a user interface (UI) based on extracted data items and/or metadata items such as for example further demonstrated herein.

Figure 3:
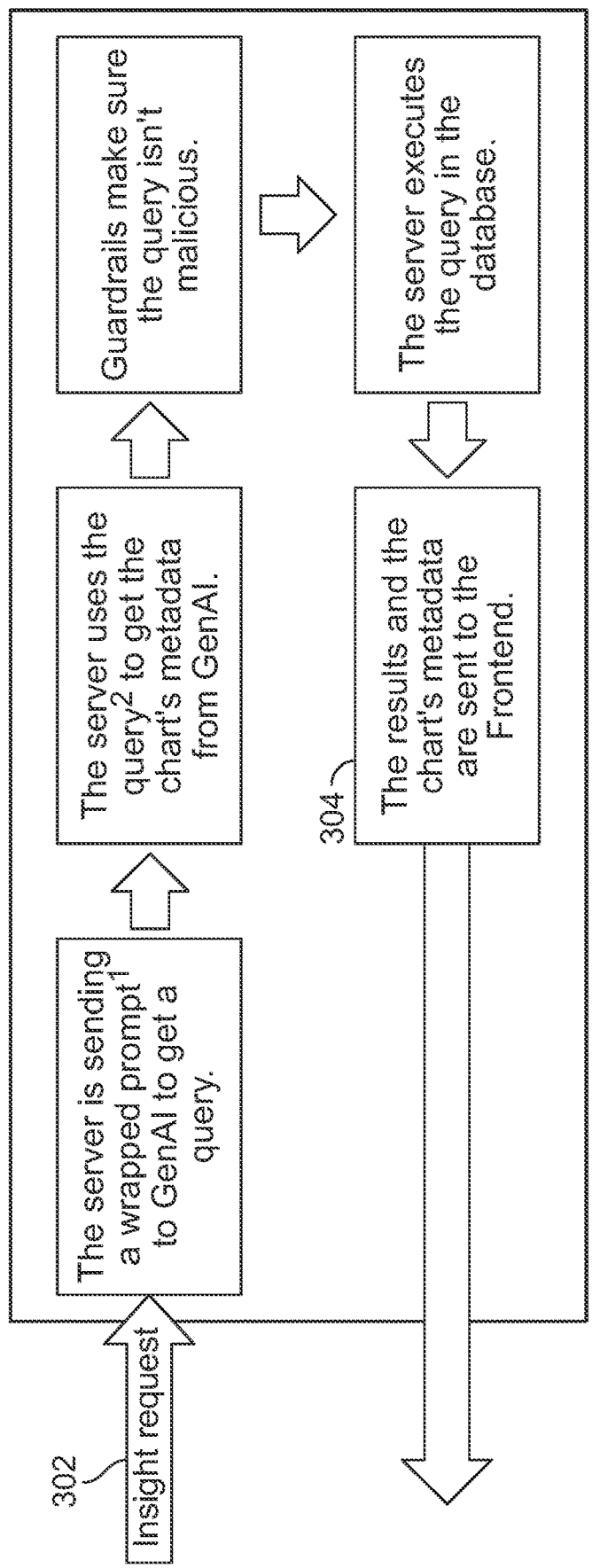
FIG. 3 shows an example microservice for artificial intelligence based generating of a database query according to some embodiments of the invention.

FIG. 3 shows an example microservice for artificial intelligence based generating of a database query according to some embodiments of the invention.

In some embodiments, the microservice may begin with receiving, at the server, an insight request from a user in free-text 302—and may end with the server sending the final JSON object to the user's system, user interface, or frontend 304 which may convert the JSON into a visual graph as further described herein. Additional, particular steps or boxes shown FIG. 3 be further described with reference to corresponding, separate figures herein.

Figure 4:
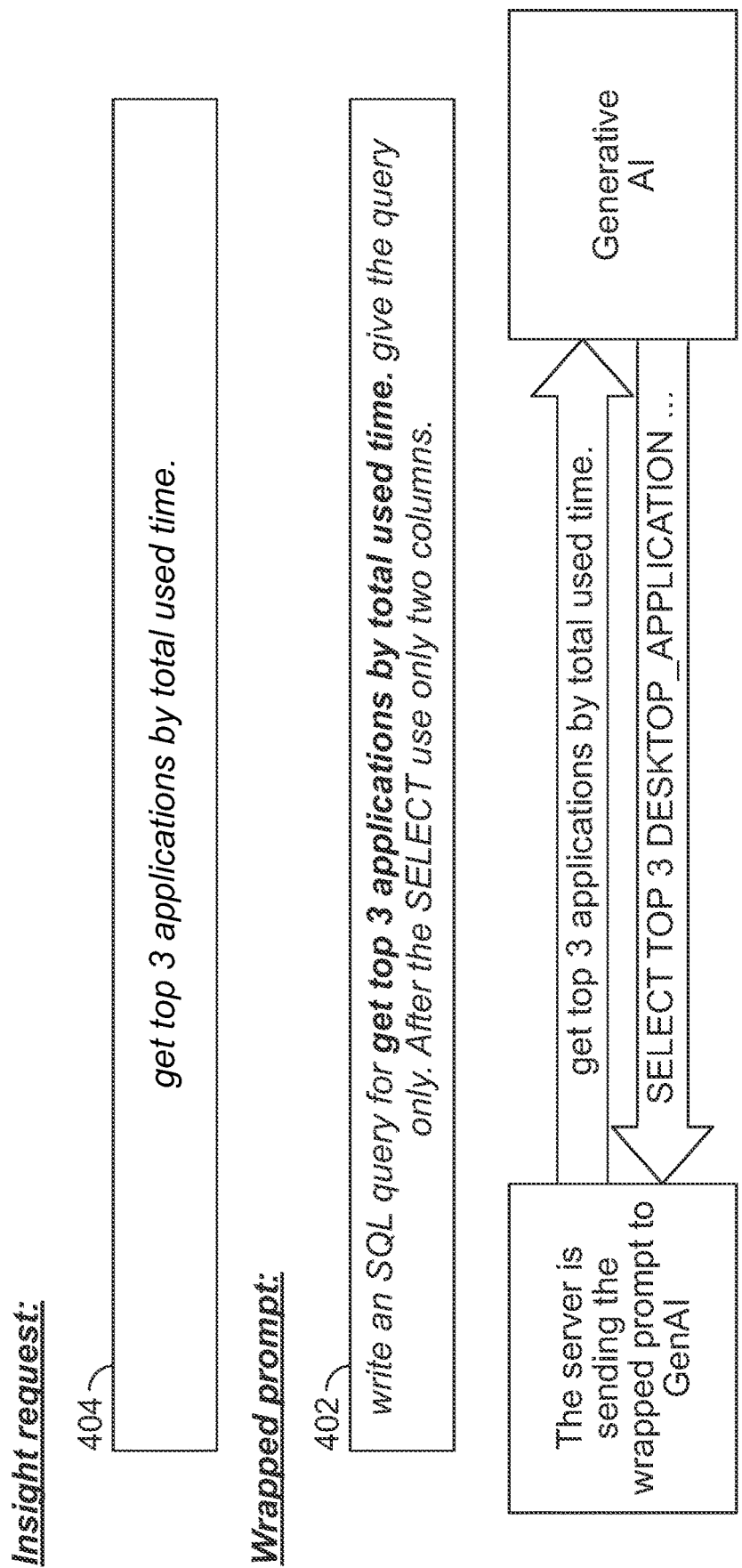
FIG. 4 shows an example prompt wrapping procedure according to some embodiments of the invention.

FIG. 4 shows an example prompt wrapping procedure according to some embodiments of the invention. In some embodiments, a wrapped prompt 402 may be or may include database structure information such as for example a description string outlining a required output format, that may be combined with an input string such as for example an insight request by a user 404 such as, e.g., further described herein.

FIG. 5 shows an example query wrapping procedure according to some embodiments of the invention. In some embodiments, the server may wrap a string or query 502 such as for example a database query received according to FIG. 4, in additional strings-which may result in a wrapped query 504. In some embodiments, a query such as for example provided or output by an appropriate GenAI model based on a text prompt may include, for example, instructions such as database or plotting operations or commands, or instructions corresponding to such operations or commands, which may be added to the generated query such as, e.g., further described herein. When the wrapped query 504 is provided as input to the appropriate GenAI model, an output including a graph's details or chart metadata 506 may be received or generated by the GenAI model. In some embodiments, the output, or graph metadata or metadata items, provided or generated by a GenAI component for a given wrapped query may be or may be included, for example, in a JSON file or format such as, e.g.:

{
"type": "bar",
"yaxis": "total_used_time",
"xaxis": "desktop_application_long_name"
}

Although additional or alternative formats may be used in different embodiments of the invention.

Figure 7:
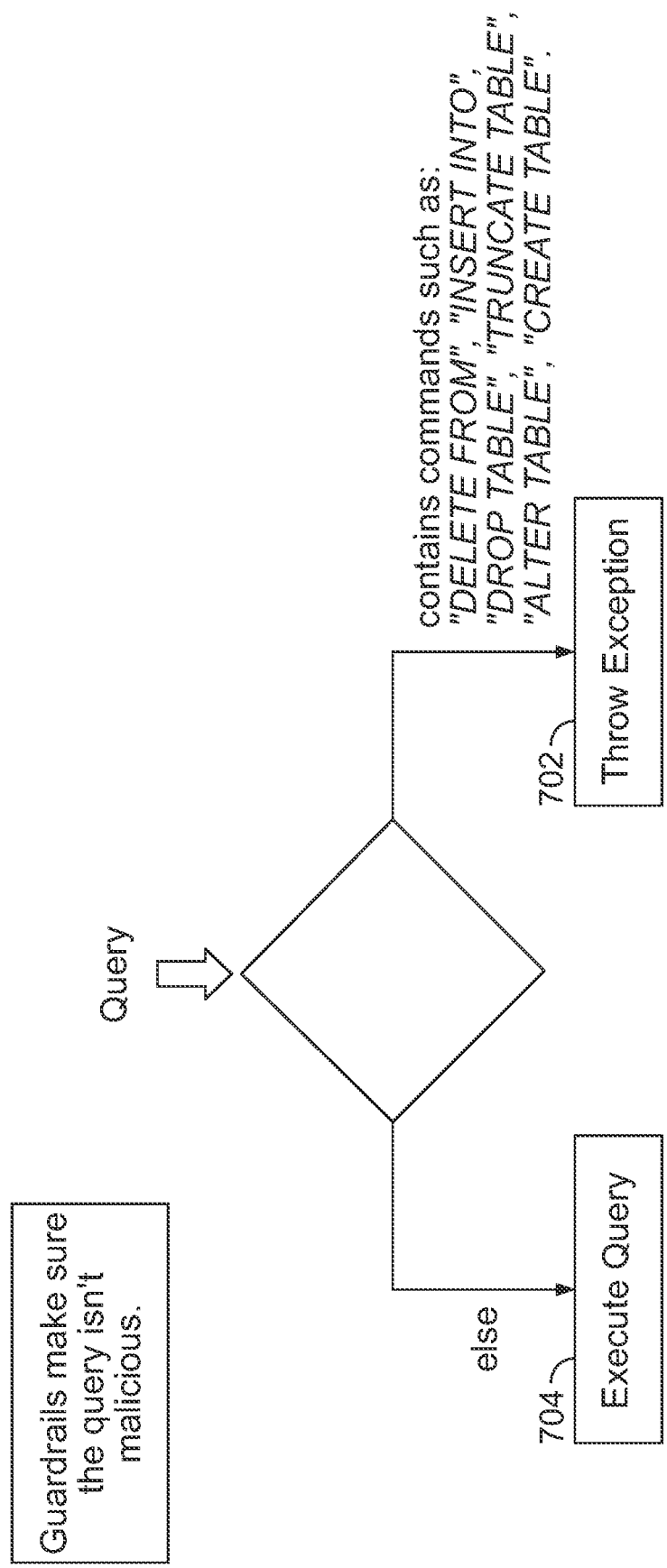
FIG. 7 shows an example query verification procedure according to some embodiments of the invention.

FIG. 7 shows an example query verification procedure according to some embodiments of the invention. In some embodiments, if the query includes one or more stop commands such as for example considered herein, or if a count value exceeds or is larger than a predetermined threshold (see further description herein) an alert may be transmitted to a remote computer using, for example, communication protocols and alert or notification formats known in the art.

Some embodiments of the invention may verify that a query (such as for example an SQL query) does not include undesirable or malicious contents. In some embodiments, a verification process may check if the query includes one or more of a set of "forbidden" keywords or commands such as: "DELETE FROM", "INSERT INTO", "DROP TABLE", "TRUNCATE TABLE", "ALTER TABLE", "CREATE TABLE". If the query contains one of these commands, embodiments may "throw", send or transmit an error or exception message or notification 702, and may stop the corresponding process of generating and executing the query. Otherwise, the query may be considered verified and be executed 704. In some embodiments, forbidden commands may be predetermined or selected, for example, by a security officer or system operator, and may for example be stored in an appropriate repository or database as known in the art. Additional or alternative query verification procedures and protocols may be used in different embodiments of the invention.

Figure 8:
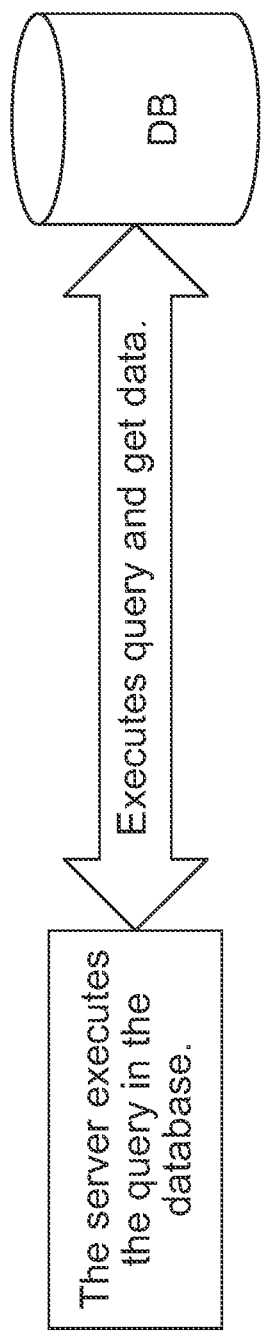
FIG. 8 illustrates an example execution of a database query according to some embodiments of the invention.

FIG. 8 illustrates an example execution of a database query according to some embodiments of the invention. In some embodiments, a JSON object or file including, for example, data received from executing a database query on a corresponding database, as well as metadata received, e.g., using a GenAI model as for example described herein, may be created and sent to the user. An example JSON object may be or may include, e.g.:

```
{
  "data": [ // This part may be data received based on executing a query
  on the database
    {
      "x": "lock-unlock-demo1",
      "y": "366228.00"
    },
    {
      "x": "explorer",
      "y": "240700.00"
    },
    {
      "x": "rtclient",
      "y": "203571.00"
    }
  ],
  "axis": { // This part may be a "chart metadata" output received based
  on a wrapped query "type": "bar",
    "yaxis": "total_used_time",
    "xaxis": "desktop_application_long_name"
  }
}
```

Although additional or alternative data objects and/or formats may be used in different embodiments.

Figure 6:
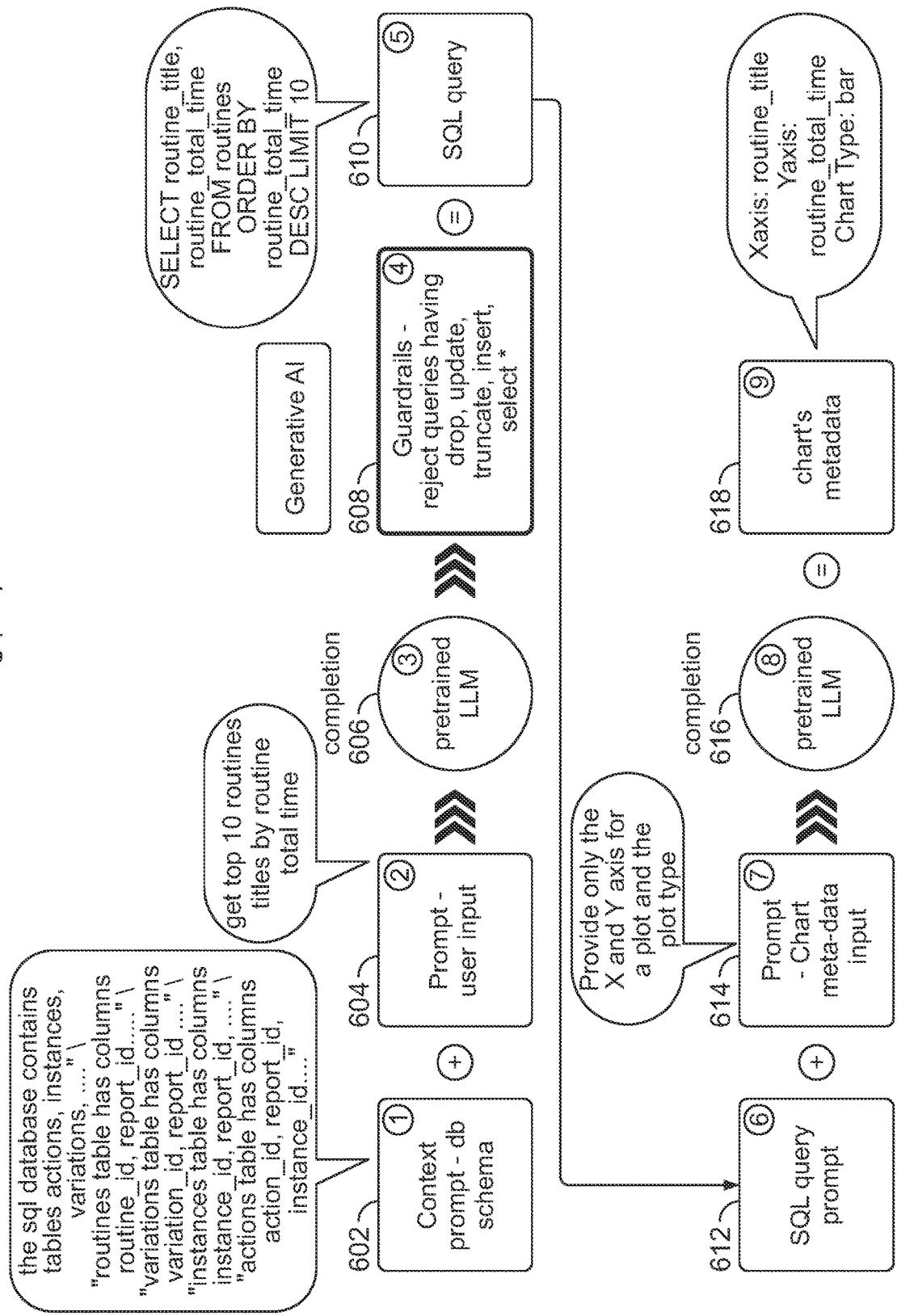
FIG. 6 illustrates a method for building and handling queries and prompts using the generative AI according to some embodiments of the invention.

FIG. 6 illustrates a method for building and handling queries and prompts using the generative AI according to some embodiments of the invention.

To provide a chart from user's input free text, a generative AI model may, in some embodiments, be utilized twice: once to create the SQL query from a text prompt (such as, e.g., an insight request or text input from a user), and once more for generating chart metadata or metadata items. In other embodiments of the invention, a first machine learning model may be used for generating the query, and a second machine learning model may be used for providing chart metadata such as for example described herein. One skilled in the art would recognize that additional or alternative embodiments, including additional or alternative machine learning models (which may not be limited to GenAI or language models) may be realized.

Initially, module (1) 602 may employ a context prompt that may be used as a prior source of information about the relevant tables' "schemas", such as for example their specific format and structure. For example, given a database containing tables $\{table_1\}, \{table_2\}, \ldots \{table_n\}$, a context prompt may include the following example structure or format:

$\{table_1\}$ has columns column $1_1$, column $2_1 \ldots$, column $k_1$.

$\{table_2\}$ has columns column $1_2$, column $2_2 \ldots$, column $k_2$.

$\{table_n\}$ has columns column $1_n$, column $2_n \ldots$, column $k_n$.

where $table_n$ may be a placeholder for the $n_{th}$ table name and column $k_n$ may be a placeholder for the $k_{th}$ column name for the $n_{th}$ table. An example context prompt may be, e.g.:

the sql database contains tables actions, instances, variations, . . . " \

"routines table has columns routine_id, report_id . . . " \

"variations table has columns variation_id, report_id . . . " \

"instances table has columns instance_id, report_id, . . . " \

"actions table has columns action_id, report_id, instance_id . . . "

Additional or alternative context prompts relating to various database schemas or formats may be used in different embodiments of the invention.

Some embodiments of the invention may generate a "create table" prompt based on prompts or wrapped prompts, where the create table prompt may be input to an LLM for creating a table, for example based on an appropriate query. Some embodiments may utilize prompts or wrapped prompts such as for example shown herein to further generate or provide a "create table" prompt which may be further converted into a query to create a new table (which may, e.g., be separate from the dataset on which other queries may be executed). In some embodiments, a "create table" prompt or query may include, for example, relevant information (such as for example all information describing for example database structure or schema) of a corresponding table or database of interest. A new or separate table which may be created using a "create table" prompt or query may include, e.g., foreign keys-which, for example, in SQL, may refer to fields or keys in the original table from which drawing insights may be desirable, as known in the art. Thus, prompts may include for example "create table" commands or operations, based on which the corresponding generative AI component may have a complete knowledge of database schema. A nonlimiting example prompt including "create table" operations may be, e.g.:

Given the following database schema: CREATE TABLE continents (ContId int primary key, Continent text, foreign key (ContId) references countries (Continent)); CREATE TABLE countries (CountryId int primary key, CountryName text, Continent int, foreign key (Continent) references continents (ContId)

Although additional or alternative example prompts may be realized (note "continents" and "countries" are used herein as example variables, by way of illustration only).

A user prompt (2) 604 may, for example, be combined or wrapped with a context prompt such as for example described herein can take any form. It may be wrapped with, or concatenated to, the context prompt according to, e.g.:

prompt_for_query=context_prompt+" "+user_input.

Together, the user input and context prompt may form, e.g., a complete in-context learning zero-shot prompt, or a prompt including context information (e.g., regarding database schemas) which may be received by a GenAI component in order to generate appropriate outputs such as for example described herein.

The prompt_query may then be applied to module (3) 606—which may be or may include, for example, a machine learning model such as for example a pretrained large language model (LLM) such as, e.g., ChatGPT 3.5 or greater or any generative AI model that may translate or convert free text to SQL commands or queries. In some embodiments, the GenAI model may have the following parameters:

max_tokens=2000, temperature=0.

(where, as known in the art, max_tokens may be a parameter controlling how many tokens, such as for example text letters, may be used in GPT responses, and temperature may be a parameter controlling the "randomness" of GPT responses) which may allow the query to have or include a virtually unlimited or infinite number of tokens and to be highly consistent and accurate. The output from the model may be a query describing or including various database operations or commands-which may be for example SQL commands having a valid SQL syntax and including all values taken from, or corresponding to, the input text prompt or user insight request. Additional or alternative GenAI or LLM components, as well as different parameters controlling various settings of such models, may be used in different embodiments.

A query verification process according to some embodiments may include calculating a count value, and if the query includes one or more stop commands such as for example considered herein, or if the count value exceeds or is larger than a predetermined threshold (see further description herein)-transmitting an alert to a remote computer using, for example, communication protocols and/or alert or notification formats known in the art. Once a database query such as for example an SQL query is provided, a security protocol, procedure, or module (4) 608 may be utilized in order to verify or make sure, e.g., that the query: does not include harmful syntax or commands that can alter the table and schema, and/or does not include select commands or operations that may result in undesirably or formidably long query execution times. In some embodiments of the invention, an appropriate vulnerability detection platform such as for example the Guardrails platform may be used for scanning and/or verifying the query—although additional platforms, programs, and procedures are known in the art and may be used in different embodiments. The following example algorithm may be used (given, e.g., example prompts, queries, and schemas such as for example described herein):

if any of ["drop", "insert", "truncate", "select *", "update"] are in query, then reject query prior to query execution, execute SELECT COUNT (*)+{part of LLM query from FROM onwards} if results>max_rows_allowed then the query is rejected else accept and execute SQL query.

In some embodiments, predetermined query parameters may be defined (e.g., by a system operator) and used, such as for example max_rows_allowed=100,000, in order to reject queries that may be expected to result, if executed, in formidably long execution times. Additional or alternative query verification procedures or parameters may be used in different embodiments.

A second part or phase where a GenAI model may be used may include generating the chart's meta data. For example, the sql_query received or accepted from module (5) 610 may be used as a prompt (6) 612 and be concatenated with a fixed, predefined or predetermined chart's meta data prompt in module (7) 614—and/or with appropriate instructions, which may include database operations which may be added to the query, and/or include identifications or specifications of, for example, chart types and/or axes to be selected, and/or axes names and/or additional information required, for example, for plotting charts such as for example described herein—to form a wrapped query, which may be a prompt input to a GenAI model to infer, for example, which of the 2 columns of the chart data extracted or output from the database may be considered as an x variable, and/or which may be considered as the y variable, and/or what chart type may be used for presenting the data.

A predetermined prompt which may be used, for example, for wrapping a database query may be, for example: "provide only the x and y axis for a plot and the plot type in json format" and an LLM in module (8) 616 (which may be, for example the same LLM used in module (3) 606, or a separate, different LLM) may produce and/or provide an output (9) 618 which may be for example a JSON data object such as for example:

{
    Xaxis: routine_title,
    Yaxis: routine_total_time,
    Type: bar
}

Such data object may include, e.g., the names or labels of the x and y axes ("routine_title" and "routine_total_time", respectively) and a chart type (such as for example a "bar" plot). Additional or alternative predetermined prompts that may be used for, e.g., wrapping database queries may be used in different embodiments of the invention.

Some embodiments of the invention may include an Analytics Portal or UI, in which the user may type a free text prompt or query to get an "Instant Insight" including, e.g., database information and/or a chart or diagram, which may be further visualized, for example, as further described herein.

Figure 9:
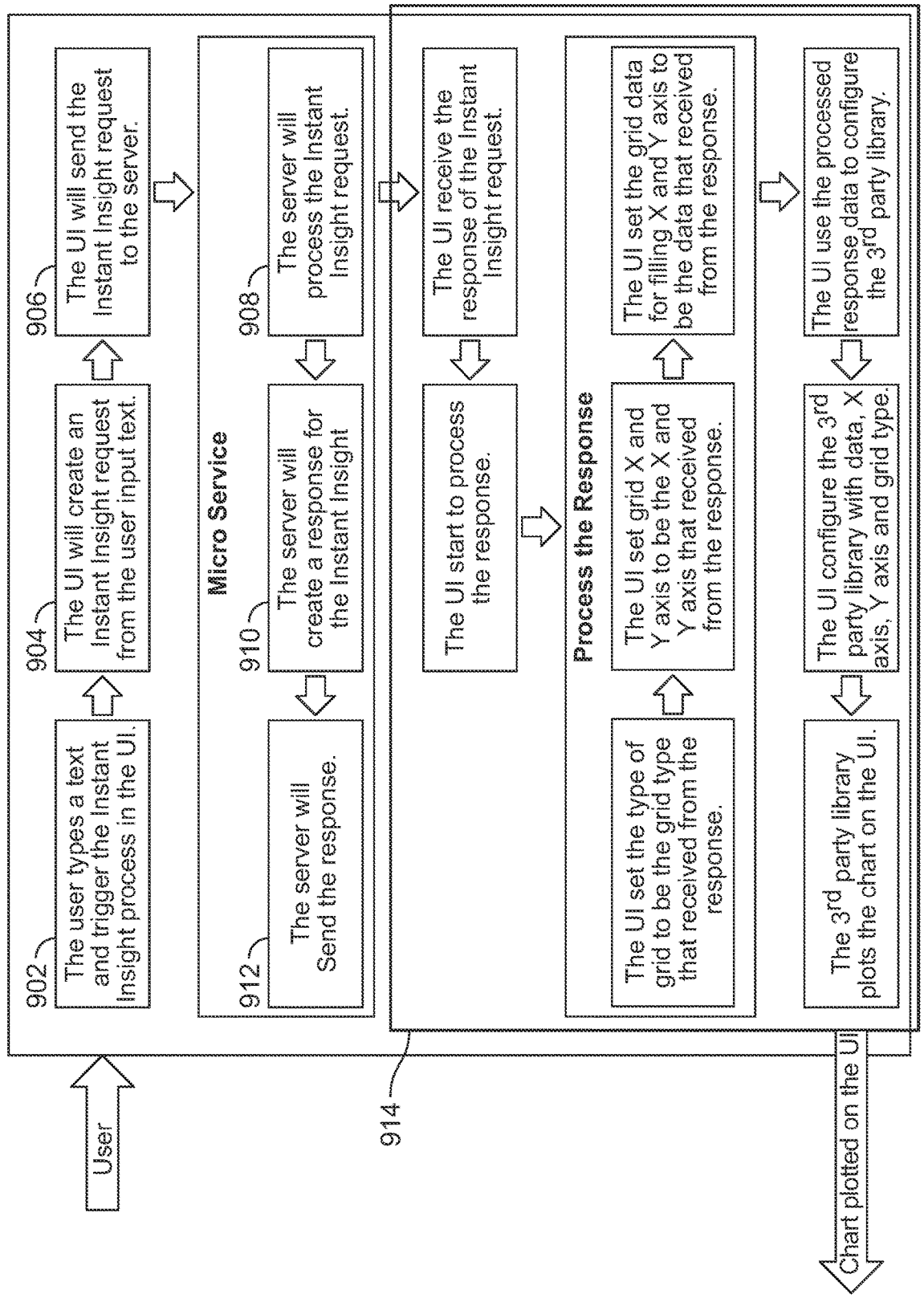
FIG. 9 illustrates an example process of automatically generating and visualizing insights provided using machine learning generated database queries according to some embodiments of the invention.

FIG. 9 illustrates an example process of automatically generating and visualizing insights provided using machine learning generated database queries according to some embodiments of the invention.

Embodiments may plot a chart on a user interface (UI) based on, e.g., data items extracted or output using an automatically generated query and automatically generated metadata items such as for example described herein. Upon receiving of a user input and the triggering of the Instant Insight process 902, the Analytics Portal or UI may create an Instant Insight request from the user's input 904 and send or transmit a request to a server 906-which may be responsible for providing an Instant Insight, for example according to the protocols and procedures described herein and based on the user's free text input. The server may then process the request 908 and, for example, following the execution of some of the processes and procedures described herein in which a response may be created 910 (which may be for example a JSON output which may contain metadata and the actual data to plot an Instant Insight chart such as for example described herein), send the response to a user interface (UI) or Analytics Portal 912.

The Analytics Portal may receive and process the response 914 for example using a third party library such as for example the 'Highcharts' JavaScript charting library, and then plot and display the Instant Insight chart on a user's device. Additional or alternative processing components or plotting libraries or tools are known in the art and may be used in different embodiments of the invention.

Figure 10:
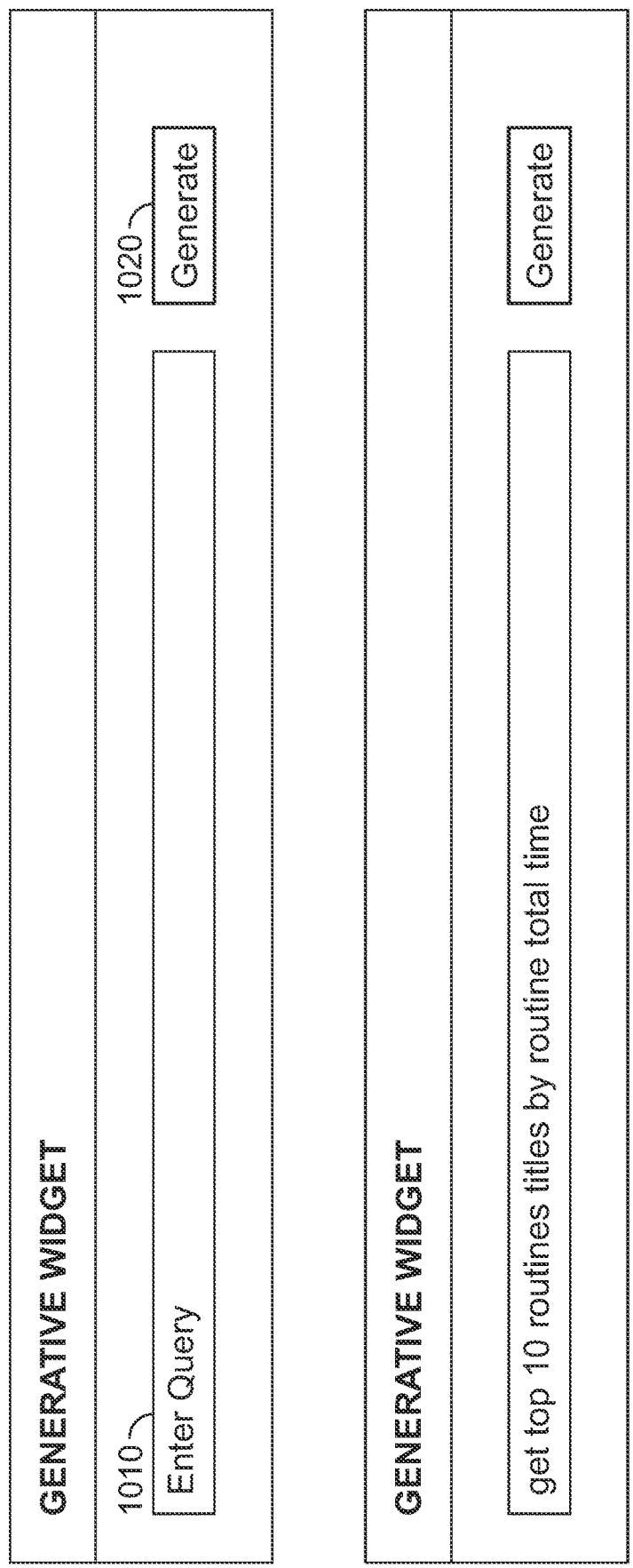
FIG. 10 shows an example user interface in an analytics portal according to some embodiments of the invention.

FIG. 10 shows an example user interface in an analytics portal according to some embodiments of the invention. In some embodiments, the user may enter free text in a relevant field 1010 and trigger or initiate the process using the Analytics Portal, for example by clicking on a 'Generate' button 1020. A web application may subsequently process the text entered by the user, and for example create a request body for the free text query, which may then be sent or transmitted to a server (which may carry out, e.g., some or all of the processes and procedures described herein). In some embodiments, a request body may be or may include, for example:

```
{
"prompt": "get top 10 routines titles by routine total time"
}
``` although additional or alternative formats and/or user interfaces may be used in different embodiments.

In some embodiments, text prompts may be received from a remote computer system (such as for example a user computer system) using a representational state transfer (REST) protocol. Embodiments may send or transmit a request such as, e.g., a representational state transfer (REST) request with the insight request body to the server. When the server finishes to process or execute the REST request (e.g., according to protocols and procedures such as for example described herein), it may return a response to the web application, which may for example include a JSON data object such as, e.g., described herein. The data object's body may contain the data and chart's metadata for plotting a chart describing the output Instant Insight as further described herein. In some embodiments, the web application or Analytics Portal may operate on a user computing device, while in other embodiments it may be running on the server carrying out processing operations such as for example described herein (in such cases, some, e.g., network based sending/transmitting operations may not be needed), or on a separate server or cloud platform. One skilled in the art would recognize many configurations including or involving appropriate network communication protocols may be included in different embodiments of the invention.

An example "body" for the JSON data object may be, e.g.:

```
{
  Data:[
    {
    "x":<text>,
    "y": <number>
    },
    {
    "x": <text>,
    "y": <number>
    },
    ...,
    ...,
    ...,
    {
    "x": <text>,
    "y": <number>
    },
    ],
    "axis": {
    "type": <chart-type>,
    "yaxis": <y-axis-param-name>,
    "xaxis": <x-axis-param-name>
    }
}
```

Although additional or alternative formats may be included and/or used in different embodiments of the invention.

The Analytics Portal or web application may process the response data object and plot a corresponding chart, for example based on the contents of the response, where, e.g., given the response data object's body provided herein: the chart type may be set to the "type" property; the x-axis may be set to the "xaxis" property; the y-axis will be set to "yaxis" property, and the chart data may be set to the "data" property included in the response item's body.

The web application may include or involve a third party library such as for example the 'Highcharts' library to plot a chart, although different library are known in the art and may be used in different embodiments. Following the processing of the response data item, a chart may accordingly be plotted.

Figure 11:
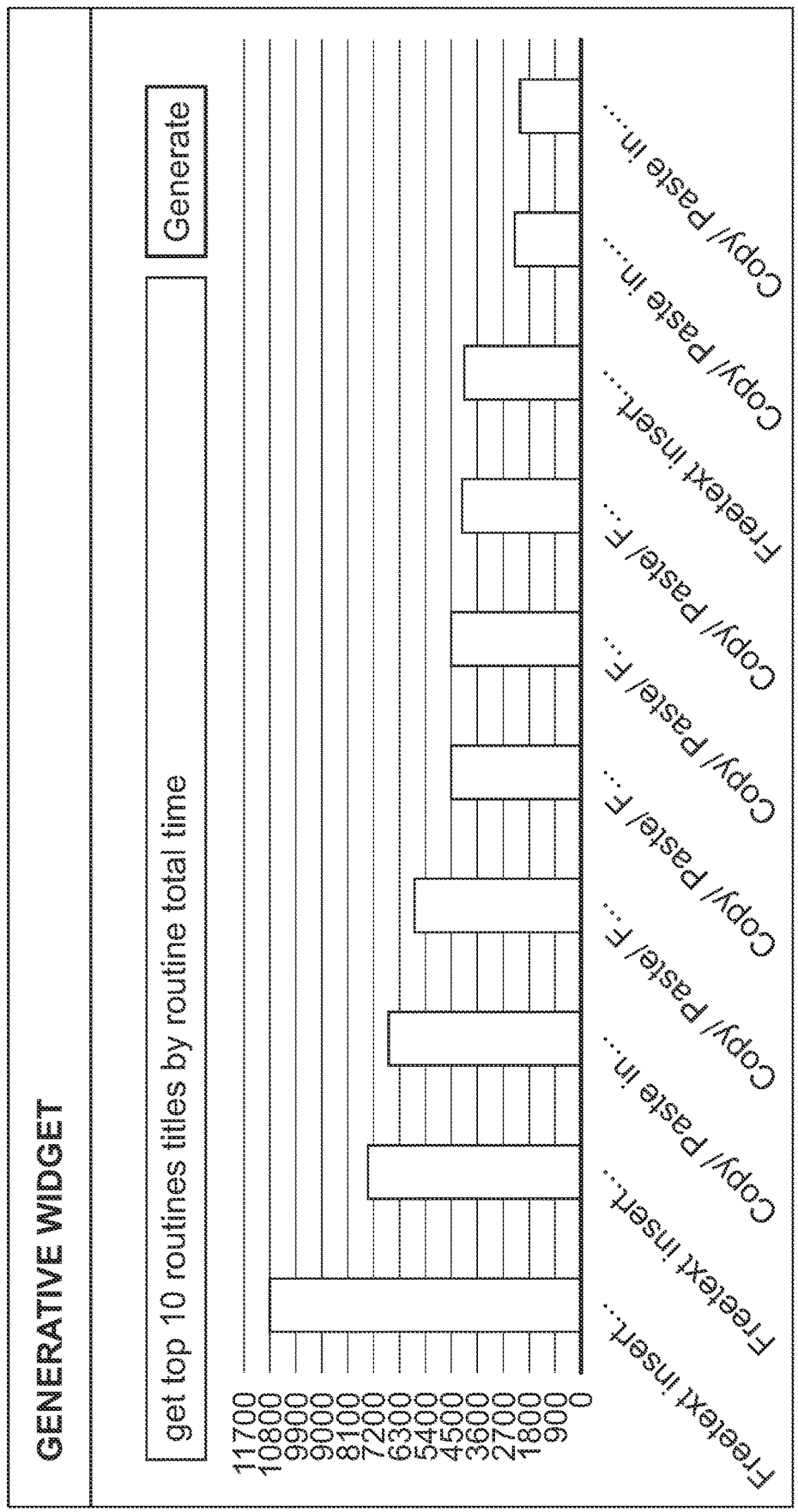
FIG. 11 shows an example plot displayed on a user interface according to some embodiments of the invention.

FIG. 11 shows an example plot displayed on a user interface according to some embodiments of the invention. It should be noted, however, that various display formats, and different approaches for embedding a plot in a UI may be used in different embodiments.

Additional or alternative processing operations or steps, as well as interfaces or UIs, may be included or used in different embodiments of the invention.

Figure 12:
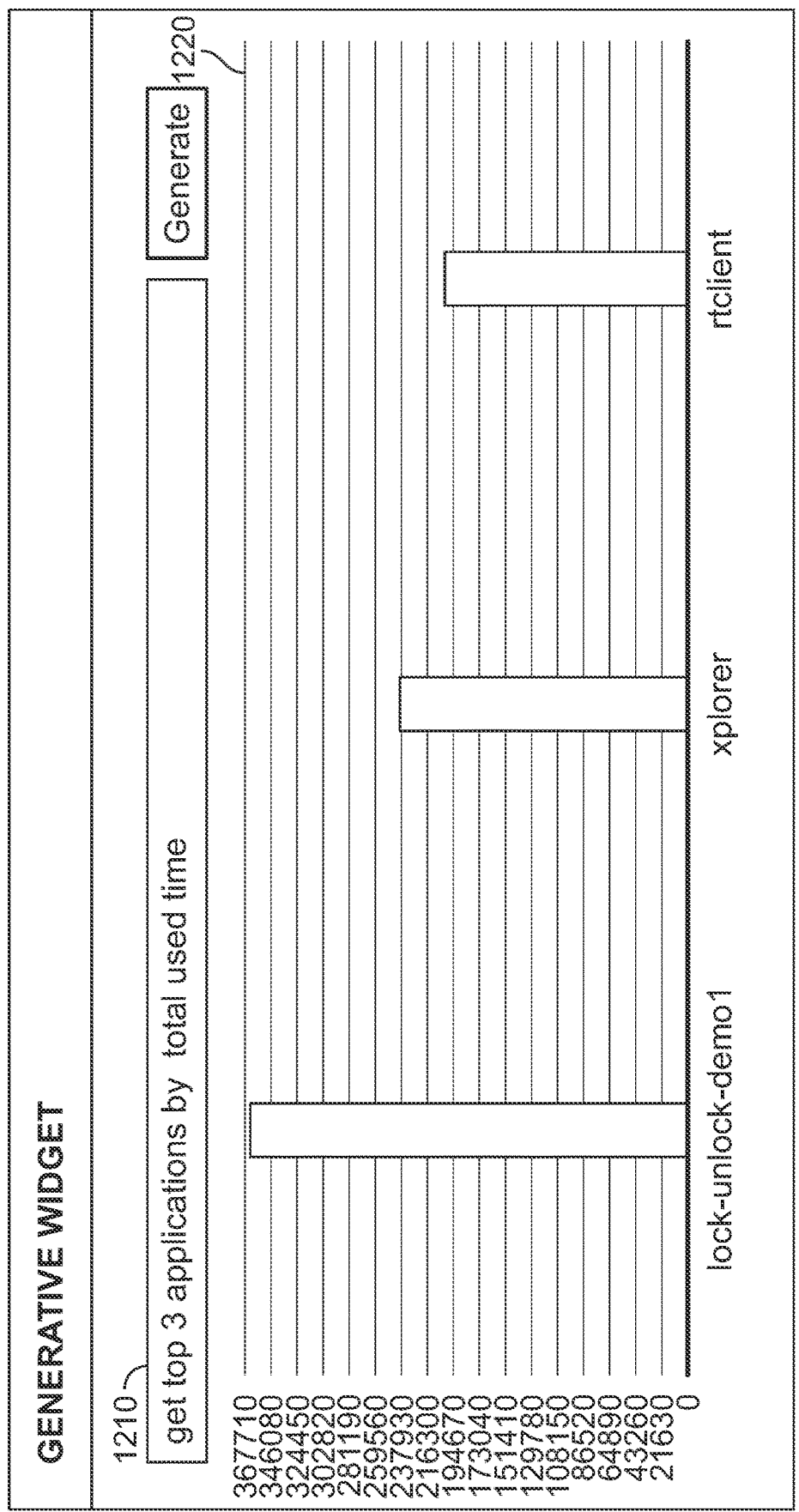
FIG. 12 illustrates example use case #1 of an artificial intelligence based generation of database queries according to some embodiments of the invention.

While some example use cases are provided herein, in which some or all of the protocols and procedures described in the present document may be used, embodiments may be used with other use cases. As further demonstrated herein, in some example embodiments, text prompts and/or queries may relate to or describe a plurality of user actions input to a computer, where the user actions collected by a desktop data collection software as known in the art of automation discovery. One skilled in the art would recognize, however, all use cases discussed herein should be considered nonlimiting. Additional or alternative use cases may be realized in different embodiments of the invention FIG. 12 illustrates example use case #1 of an artificial intelligence based generation of database queries according to some embodiments of the invention. In use case #1, a user asks for the top 3 used applications 1210, or for the three applications most used among a plurality of users—as may for example be documented in a corresponding database of user actions, using for example a desktop monitoring software as known in the art. In the web application or analytics portal, the user may write a free-text prompt or query to a 'Generative Widget' input text. The user may click on the 'Generate' button, and a request may be sent to a server using a REST protocol. The resulting insight request body may be:

```
{
"prompt": "get top 3 applications by total used time"
}
```

The server may process the insight request, e.g., according to various protocols and procedures such as for example described herein, and return or output a JSON file or object with the data and chart's metadata-which may sent or transmitted as a response to the web application or user device. As discussed herein, data may be fetched from the database using or based on a query (such as for example an SQL query generated using protocols and procedures described herein). The resulting JSON object and/or response may be:

```
{
  "data": [
    {
    "x": "lock-unlock-demo1",
    "y": "366228.00"
    },
    {
    "x": "explorer",
    "y": "240700.00"
    },
    {
    "x": "rtclient",
```

```
            "y": "203571.00"
        }
    ],
    "axis": {
        "type": "bar",
        "yaxis": "total_used_time",
        "xaxis": "desktop_application_long_name"
    }
}
```

The web application or analytics portal may process the response or JSON file and plot a chart 1220 based on the axis properties as follows: the chart type may be set to "type" in the response, which in this case may be a "bar" chart type; the x-axis may be set to "xaxis", which in this case may be "desktop_application_long_name"; the y-axis may be set to "yaxis", which in this case may be "total_used_time"; and the chart data may be set to the "data" property. The web application may use a third party library such as for example the 'Highcharts' library to plot the chart-which may be performed after the processing of the JSON response. In the resulting chart, the top three used applications, or three applications most used according to a database of user actions may be shown.

Figure 13:
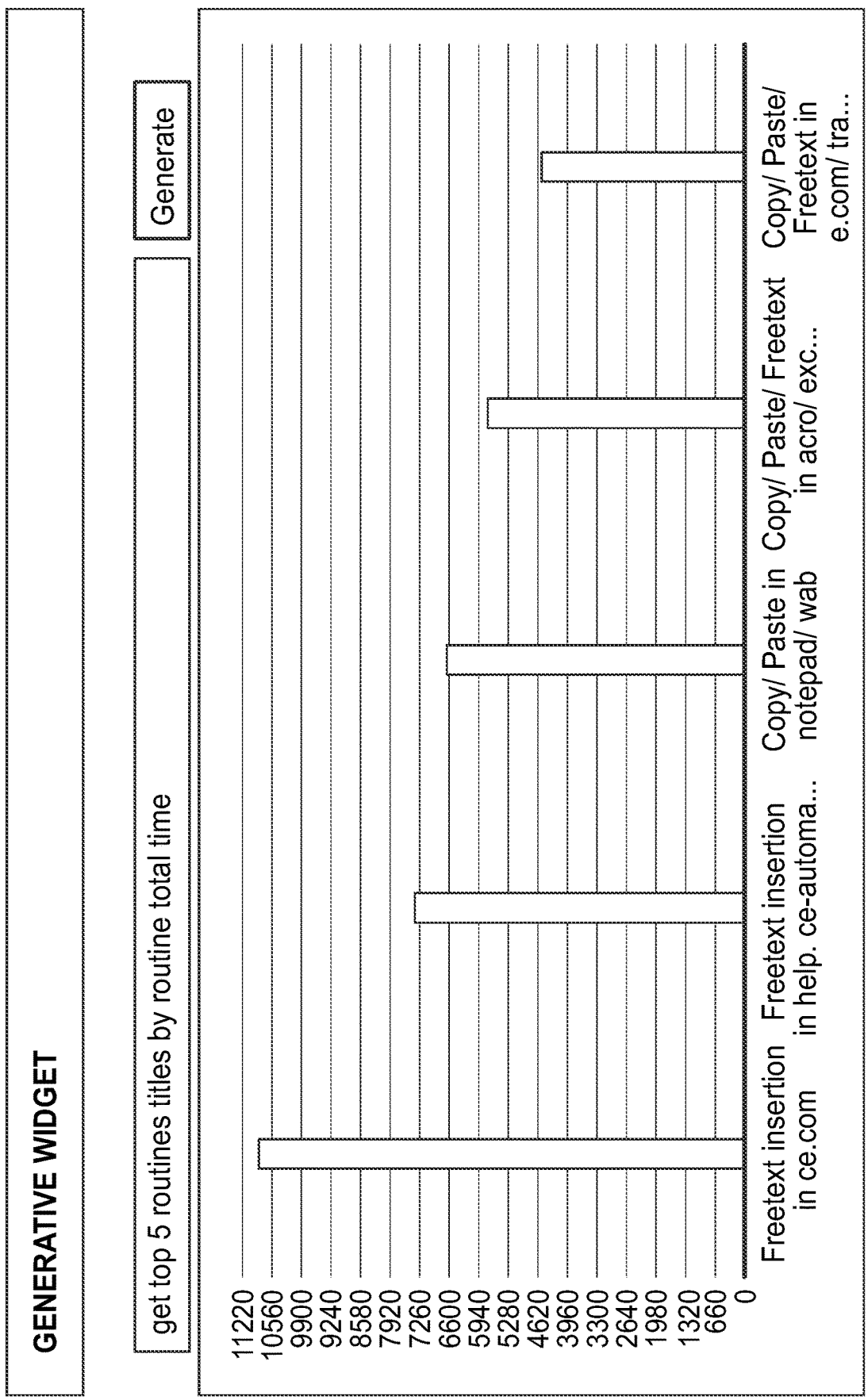
FIG. 13 illustrates example use case #2 of an artificial intelligence based generation of database queries according to some embodiments of the invention.

FIG. 13 illustrates example use case #2 of an artificial intelligence based generation of database queries according to some embodiments of the invention. In use case #2, a user asks for the top 5 routines by routine total time, where the routines may have been executed by a plurality of users. The user enters a free text request and may click on the 'Generate' button, and a request may be sent to a server using a REST protocol, e.g., as described herein. The resulting insight request body may be:

```
{
    "prompt": "get top 5 routines titles by routine total time"
}
```

The server may process the insight request, e.g., according to various protocols and procedures such as for example described herein, and return or output a JSON file or object with the data and chart's metadata as a response such as for example described herein. The resulting JSON object and/or response may be:

```
{
    "data": [
        {
            "x": "Freetext insertion in ce.com",
            "y": 10946.6
        },
        {
            "x": "Freetext insertion in help.ce-automation.com",
            "y": 7437.57
        },
        {
            "x": "Copy/ Paste in notepad/ wab",
            "y": 6721.48
        },
        {
            "x": "Copy/ Paste/ Freetext in acrobat/ excel/ help.nice-automation.com/ nice.com/notepad/ outlook/ spth.gob.es",
            "y": 5834.77
        },
        {
            "x": "Copy/ Paste/ Freetext in nice.com/ training crm application",
            "y": 4607.27
        }
```

```
    ],
    "type": "bar",
    "yaxis": "routine_total_time",
    "xaxis": "routine_title"
}
```

The web application or analytics portal may process the response or JSON file and plot a chart based on the axis properties as follows: the chart type may be set to "type" in the response, which in this case may be a "bar" chart type; the x-axis may be set to "xaxis", which in this case may be "routine_title"; the y-axis may be set to "yaxis", which in this case may be "routine_total_time"; and the chart data may be set to the "data" property. As noted herein, the web application may for example use a third party library such as for example the 'Highcharts' library to plot the chart—which may be performed after the processing of the JSON response.

In some embodiments of the invention, a user may use the data from a previously generated chart to further extend or investigate the analytics or insights provided in that chart.

Figure 14:
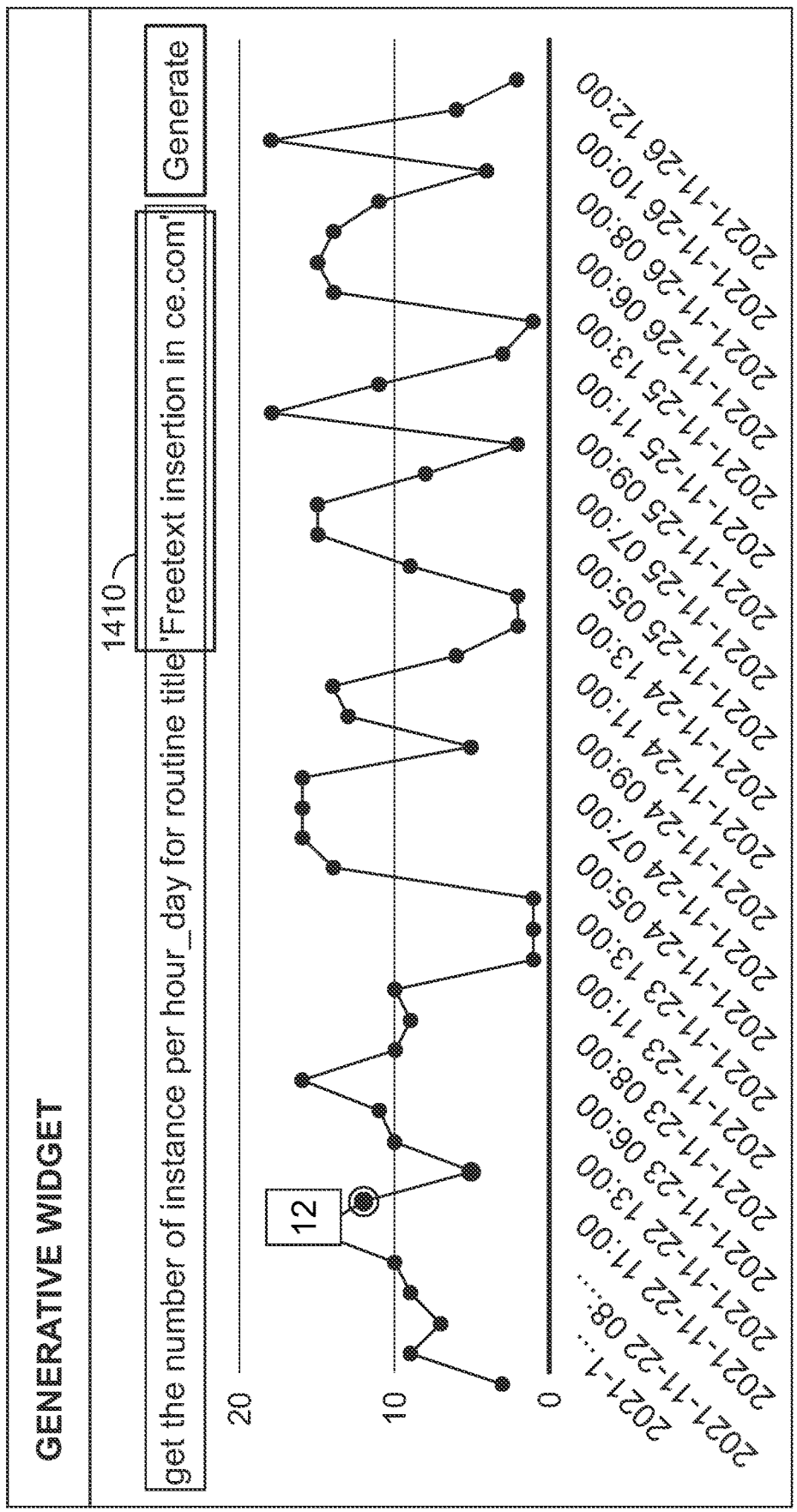
FIG. 14 illustrates example use case #3 of an artificial intelligence based generation of database queries according to some embodiments of the invention.

FIG. 14 illustrates example use case #3 of an artificial intelligence based generation of database queries according to some embodiments of the invention. In use case #3, a user asks for the number of instances per hour for the top or first ranked routine as shown or described in a previous chart (such as for example the chart or plot of FIG. 13 herein)—where "instances" may refer to times the routine was executed by a user or a plurality of users, as may be documented for example in a database of user actions as known in the art. The user may thus use or include the relevant routine's name 1410 as shown in the relevant, previously generated chart in a corresponding free-text input or request such as, e.g.:

```
{
    "prompt": "get the number of instances by hour_day for
        routine title "Freetext insertion"
}
```

The request may be transmitted to the server and processed, e.g., as described herein. The resulting JSON object and/or response may be:

```
{
    "data":[
        {
            "x": "2021-11-22 06:00",
            "y": 3
        },
        {
            "x": "2021-11-22 07:00",
            "y": 9
        },
        {"x":
            "2021-11-22 08:00",
            "y": 7
        },
        {
            "x": "2021-11-22 09:00",
            "y": 9
        },
        {
            "x": "2021-11-22 11:00",
            "y": 10
        },
        {
```

```
      "x": "2021-11-22 12:00",
      "y": 15
   },
   {
      "x": "2021-11-22 13:00",
      "y": 12
   },
   {
      "x": "2021-11-22 14:00",
      "y": 5
   },
   {
      "x": "2021-11-23 06:00",
      "y": 10
   },
   {
      "x": "2021-11-23 07:00",
      "y": 11
   },
   {
      "x": "2021-11-23 08:00",
      "y": 16
   },
   {
      "x": "2021-11-23 09:00",
      "y": 10
   },
   {
      "x": "2021-11-23 11:00",
      "y": 9
   },
   {
      "x": "2021-11-23 12:00",
      "y": 10
   },
   {
      "x": "2021-11-23 13:00",
      "y": 1
   },
   {
      "x": "2021-11-24 02:00",
      "y": 1
   },
   {
      "x": "2021-11-24 05:00",
      "y": 1
   },
   {
      "x": "2021-11-24 06:00",
      "y": 14
   },
   {
      "x": "2021-11-24 07:00",
      "y": 16
   },
   {
      "x": "2021-11-24 08:00",
      "y": 16
   },
   {
      "x": "2021-11-24 09:00", {"y": 16
   },
   {
      "x": "2021-11-24 10:00",
      "y": 5
   },
   {
      "x": "2021-11-24 11:00",
      "y": 13
   },
   {
      "x": "2021-11-24 12:00",
      "y": 14
   },
   {
      "x": "2021-11-24 13:00",
      "y": 6
   },
   {
      "x": "2021-11-24 14:00",
      "y": 2
   },
   {
      "x": "2021-11-25 05:00",
      "y": 2
   },
   {
      "x": "2021-11-25 06:00",
      "y": 9
   },
   {
      "x": "2021-11-25 07:00",
      "y": 15
   },
   {
      "x": "2021-11-25 08:00",
      "y": 15
   },
   {
      "x": "2021-11-25 09:00",
      "y": 8
   },
   {
      "x": "2021-11-25 10:00",
      "y": 2
   },
   {
      "x": "2021-11-25 11:00",
      "y": 18
   },
   {
      "x": "2021-11-25 12:00",
      "y": 11
   },
   {
      "x": "2021-11-25 13:00",
      "y": 3
   },
   {
      "x": "2021-11-25 14:00",
      "y": 1
   },
   {
      "x": "2021-11-26 06:00",
      "y": 14
   },
   {
      "x": "2021-11-26 07:00",
      "y": 15
   },
   {
      "x": "2021-11-26 08:00",
      "y": 14
   },
```

```
{
    "x": "2021-11-26 09:00",
    "y": 11
},
{
    "x": "2021-11-26 10:00",
    "y": 4
},
{
    "x": "2021-11-26 11:00",
    "y": 18
},
{
    "x": "2021-11-26 12:00",
    "y": 6
},
{
    "x": "2021-11-26 13:00",
    "y": 2
}
],
"type": "line",
"yaxis": "num_instances",
"xaxis": "hour_day"
}
```

The web application or analytics portal may process the response or JSON file and plot a chart based on the axis properties as follows: the chart type may be set to "type" in the response, which in this case may be a "line" chart type; the x-axis may be set to "xaxis", which in this case may be "hour_day"; the y-axis may be set to "yaxis", which in this case may be "num_instances"; and the chart data may be set to the "data" property. As described herein, the web application may for example use a 3rd party library such as for example the 'Highcharts' library to plot the chart—which may be performed after the processing of the JSON response.

Figure 15:
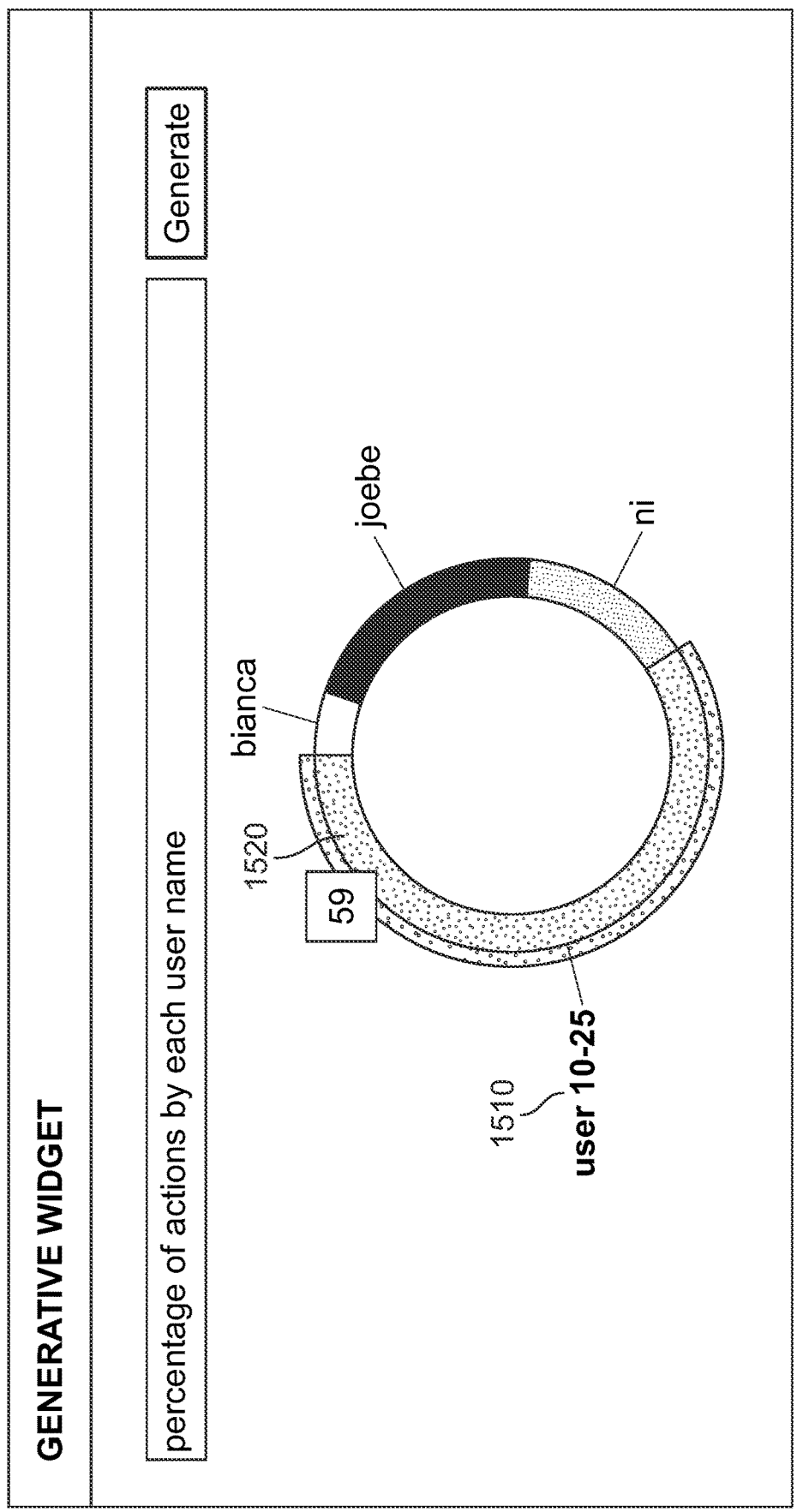
FIG. 15 illustrates example use case #4 of an artificial intelligence based generation of database queries according to some embodiments of the invention.

FIG. 15 illustrates example use case #4 of an artificial intelligence based generation of database queries according to some embodiments of the invention. In use case #4, a user or analyst asks for displaying the percentages of actions executed by different users as part of all actions executed by all users, as may for example be documented in a database of user actions based on a data collection software as known in the relevant arts. The analyst may enter a free text request which may be sent to the server as, e.g., described herein. The resulting insight request body may be:

```
{
    "prompt": "percentage of actions by each user name"
}
```

The server may process the insight request, e.g., according to various protocols and procedures such as for example described herein, and return or output a JSON object and/or response such as for example:

```
{
    "data": [
        {
            "x": "bianca",
            "y": 5.26894
        },
        {
            "x": "joebe",
            "y": 21.18324
        },
        {
            "x": "ni",
```

-continued

```
            "y": 14.40982
        },
        {
            "x": " user 10-25",
            "y": 59.138
        }
    ],
    "type": "pie",
    "yaxis": "percentage_of_actions",
    "xaxis": "user_name"
}
```

The web application or analytics portal may process the response or JSON file and plot a chart based on the axis properties as follows: the chart type may be set to "type" in the response, which in this case may be a "pie" chart type; the x-axis may be set to "xaxis", which in this case may be "user_name"; the y-axis may be set to "yaxis", which in this case may be "percentage_of_actions"; and the chart data may be set to the "data" property. As noted herein, the web application may for example use a 3rd party library such as for example the 'Highcharts' library to the plot the chart-which may be performed after the processing of the JSON response.

In some embodiments, a chart or graph may include data and/or variables that may be interactively displayed on a UI, for example, based on an interaction with an input device controlled by a user. In such manner, a specific percentage of the actions carried out by a given user 1510 among all actions carried out by all users may be displayed, for example, upon the dragging of a mouse by the user or analyst and pointing to the part of the pie chart 1520 representing the user. In this context, various platforms known in the art may be used for producing different visualizations (such as, e.g., interactive visualizations) in different embodiments of the invention.

As known in art of automation discovery, a plurality of computer processes may be scored or ranked according to the utility of their potential automation, or, in other words, according to their potential utility as automation candidates or opportunities. In this context, many scoring algorithms and/or formulas are known in the art. Some embodiments of the invention may be used for finding and visualizing automation candidates based on automation scores.

Figure 16:
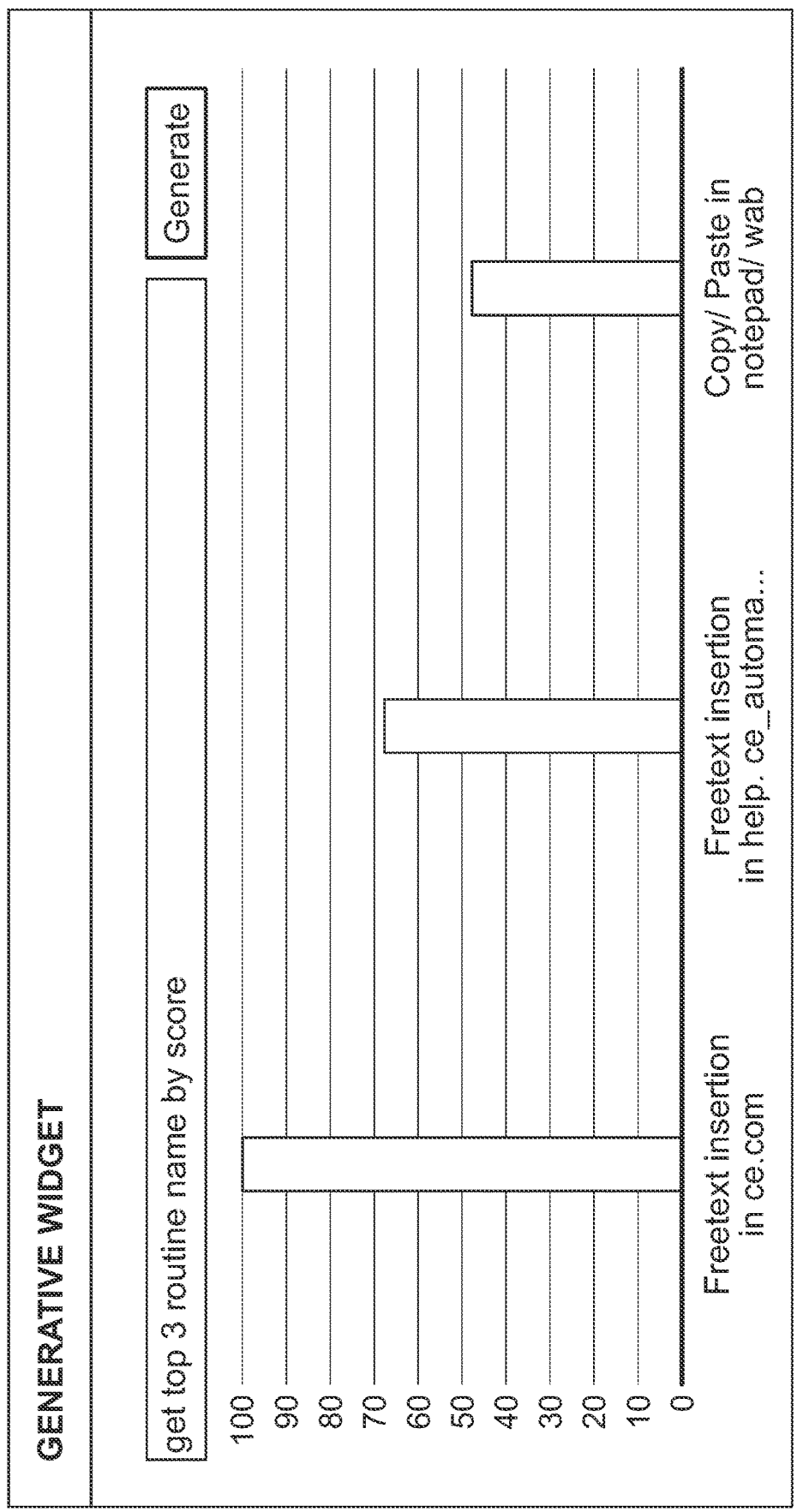
FIG. 16 illustrates example use case #5 of an artificial intelligence based generation of database queries according to some embodiments of the invention.

FIG. 16 illustrates example use case #5 of an artificial intelligence based generation of database queries according to some embodiments of the invention. In use case #5, a user or analyst asks for the 3 top scored or ranked routines or automation candidates, as may be indicated or documented for example in a database of user actions or routines, and where scores may be calculated, e.g., based on the number of instances of a given routine within a predetermined time period (such as for example 1 hour). A corresponding free-text input or request by the user, such as, e.g.:

```
{
    "prompt": "get top 3 routine name by score"
}
``` may be transmitted to the server and processed, e.g., as described herein. The resulting JSON object and/or response may be:

```
{
    "data": [
        {
            "x": "Freetext insertion in ce.com",
```

```
            "y": 100.00
        },
        {
            "x": "Freetext insertion in help. ce-automation.com",
            "y": 67.8424
        },
        {
            "x": "Copy/ Paste in notepad/ wab",
            "y": 48.3732
        }
    ],
    "type": "bar",
    "yaxis": "routine_score",
    "xaxis": "routine_title"
}
```

The web application or analytics portal may process the response or JSON file and plot a corresponding chart or graph, e.g., according to the processes and procedures described herein.

Figure 17:
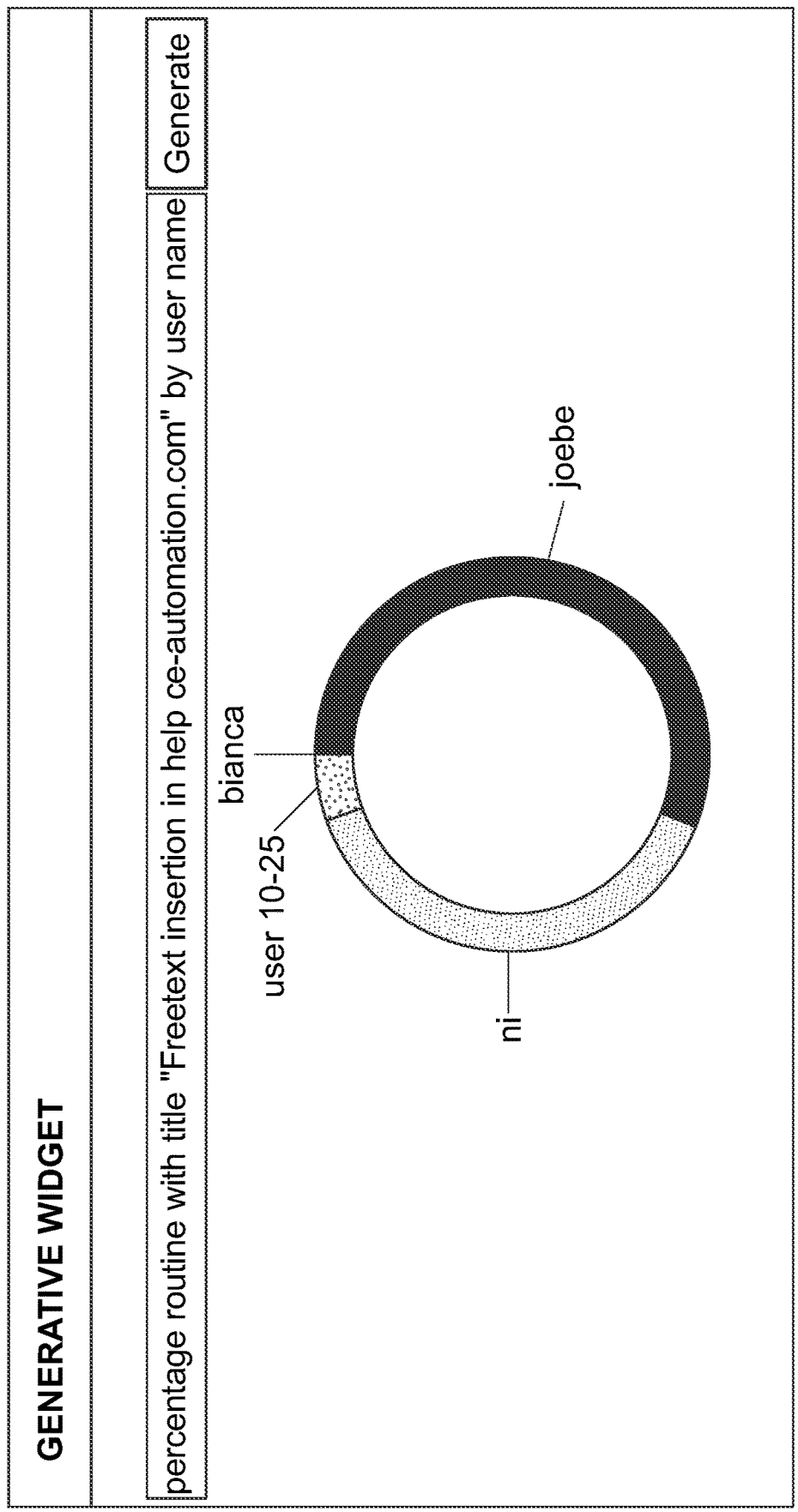
FIG. 17 illustrates example use case #6 of an artificial intelligence based generation of database queries according to some embodiments of the invention.

FIG. 17 illustrates example use case #6 of an artificial intelligence based generation of database queries according to some embodiments of the invention. In use case #6, a user or analyst asks for the percentage of a routine with the title "Freetext insertion" by user name—which may, in other words, correspond to the part among instances of a given routine (which may be, e.g., the 2$^{nd}$ highest scored routine from use case #5 provided herein) that may be attributed to or associated with a specific user or user profile—as may for example be indicated or documented in a database of user actions or routines using, e.g., a desktop data collection software on computer systems operated by a plurality of different users as known in the art. A corresponding free-text input or request by the user, such as, e.g.:

```
{
"prompt": "percentage routine with title "Freetext insertion in help. ce-automation.com" by user name"
}
``` may be transmitted to the server and processed, e.g., as described herein. In this context, and despite a possibly poor choice of words by the user or analyst, a GenAI component such as for example described herein may still generate a desirable output database query which may be used for pulling or extracting or outputting the relevant data, and may thus provide a desirable outcome while accepting a wide range of inputs which do not have to be predefined or prespecified, as known in the art of generative artificial intelligence. The resulting JSON object and/or response may be:

```
{
    "data": [
        {
            "x": "bianca",
            "y": 0
        },
        {
            "x": "joebe",
            "y": 14.23786
        },
        {
            "x": "ni",
            "y": 9.70149
        },
        {
            "x": " user 10-25",
            "y": 1.41129
        }
    ],
```

```
    "type": "pie",
    "yaxis": "percentage",
    "xaxis": "user_name"
}
```

The web application or analytics portal may process the response or JSON file and plot a corresponding chart or graph, e.g., according to the processes and procedures described herein.

One skilled in the relevant arts would recognize that additional or alternative use cases in various contexts, including but not limited to automation discovery and/or QM related contexts, may be realized in different embodiments of the invention.

Some embodiments of the invention may select and execute a plurality of computer processes based, for example, on extracted data items or on data or information items extracted based on a query such as for example described herein. Some embodiments may perform automated computer actions according to insights generated using generative AI models such as for example described herein.

Figure 18:
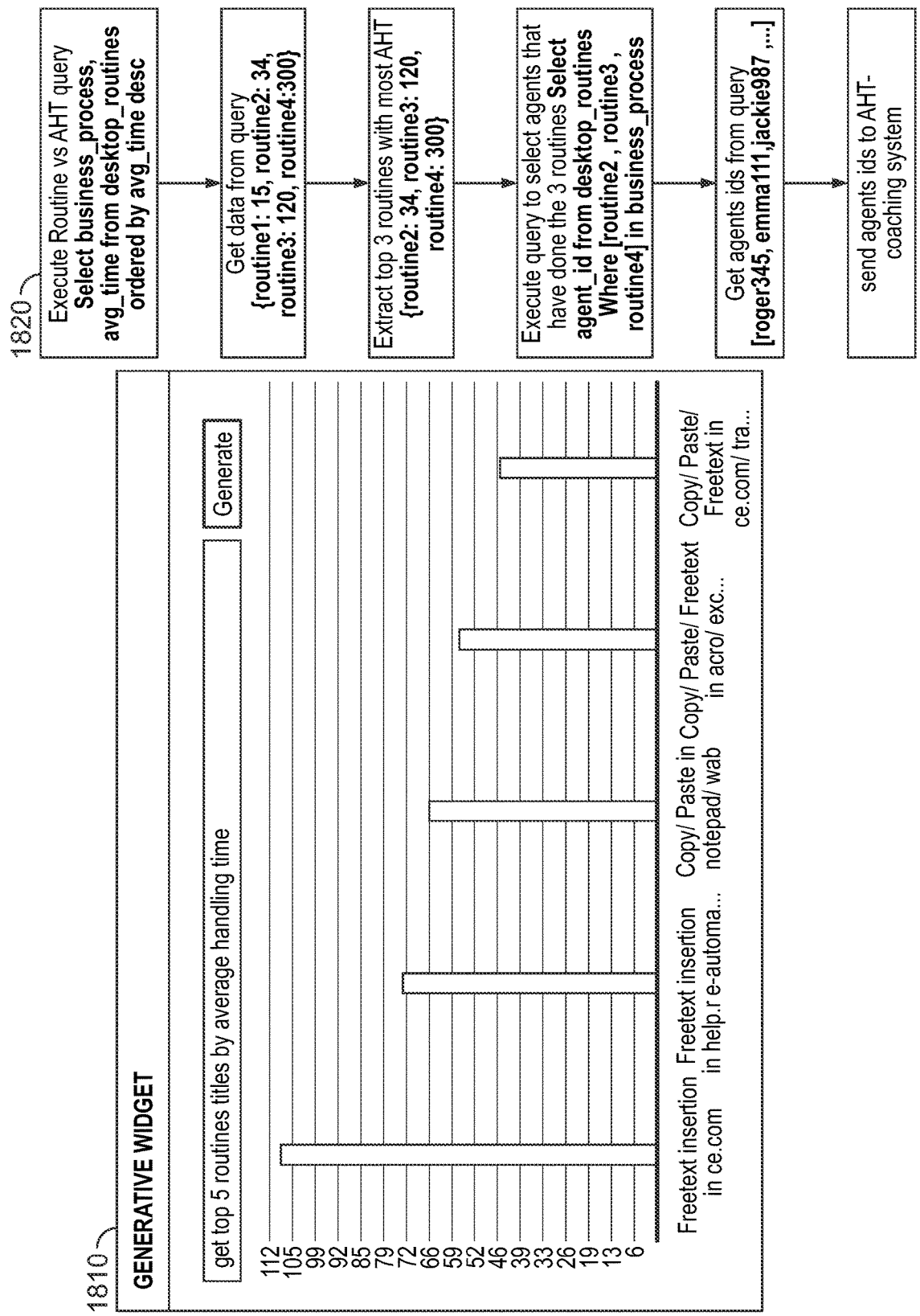
FIG. 18 illustrates example use case #7 of an artificial intelligence based generation of database queries according to some embodiments of the invention.

FIG. 18 illustrates example use case #7 of an artificial intelligence based generation of database queries according to some embodiments of the invention. In use case #7, a user or analyst asks for the top 5 routines by routine average handling time (AHT), or for the 5 routines that, on average, take the longest time to execute—as may for example be indicated or documented in a database of user actions or routines using, e.g., a desktop data collection software on computer systems operated by a plurality of different users, and as implemented in or integrated with quality management (QM) systems and methods as known in the art. Once a response for an appropriate prompt is received and a plot 1810 is generated or provided, embodiments may execute a corresponding algorithm 1820 to automatically select, for example, the top 3 routines or, e.g., select the top 30% percentile. An automated command or query may then be used in some embodiments to select the relevant users or agents that executed these routines, as described in the database of user actions for example using agent IDs and as known in the art. An AHT optimization coaching session may, for example, be automatically scheduled for the selected agents.

It should be noted that additional or alternative automated actions and/or computer processes may be performed, executed, or conducted using different embodiments of the invention, including but not limited to automatically executing computer actions or routines (such as for example automatically executing a given routine in a time period where the routine found to be most commonly executed based on a database of user actions such as for example mentioned herein) based on insights provided by GenAI such as for example described herein may be included in different embodiments of the invention.

Embodiments of the invention may improve data analysis technologies by providing a user friendly, natural language based approach for producing database queries and corresponding data driven insights without requiring technical expertise (e.g., in SQL and/or additional relevant programming languages and tools) from a human user. Accordingly, embodiments may improve data analysis technologies by minimizing human errors which may result, for example, by a human analyst being responsible for database operations or writing database commands which might result in undesirable loss of data or in overwriting existing datasets. Embodiments may provide a standardized framework for generating database queries and plotting data driven insights which may minimize or eliminate human biases relating to particular query contents, plot settings and properties, and the like- according to the various protocols and procedures described herein.

Figure 19:
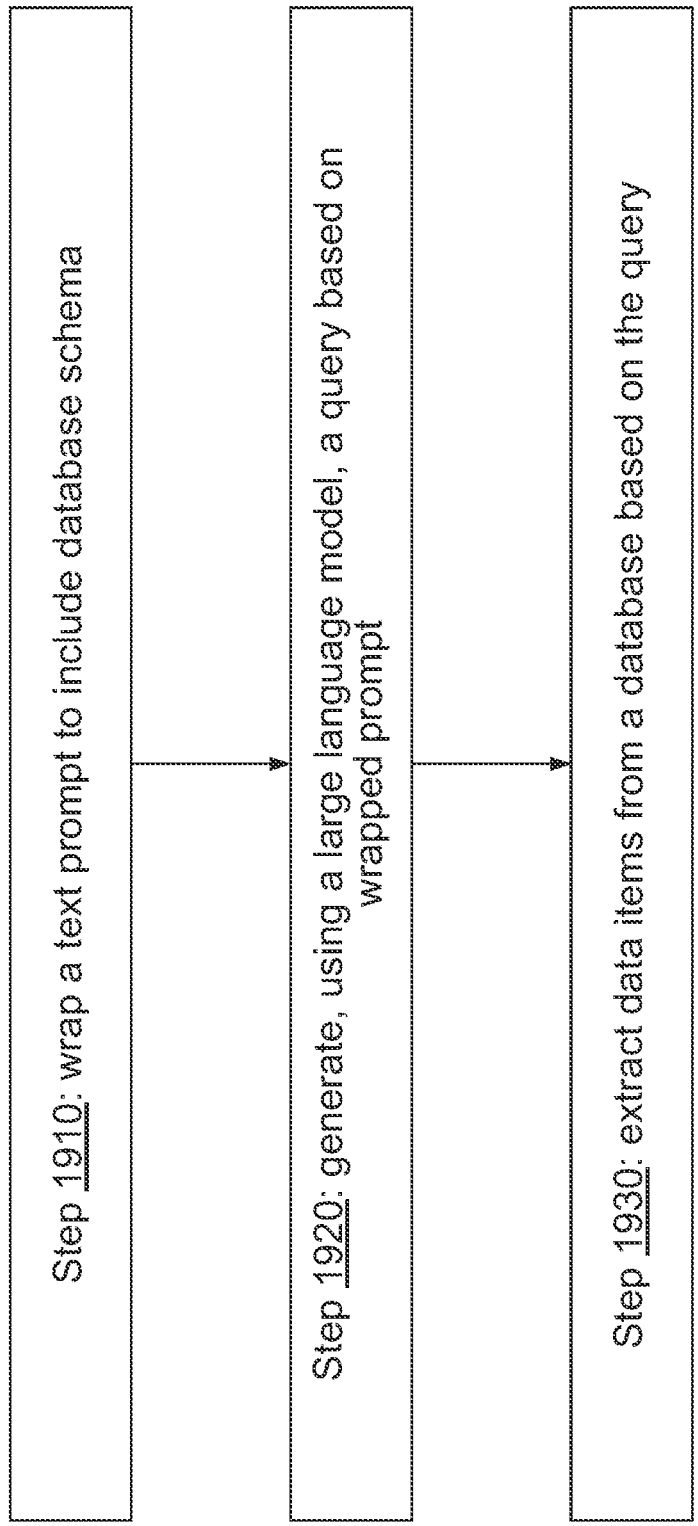
FIG. 19 is a flowchart of an example method of generating artificial intelligence based database queries according to some embodiments of the invention.

FIG. 19 is a flowchart of an example method of generating artificial intelligence based database queries according to some embodiments of the invention. In step 1910, embodiments may wrap a text prompt, where the wrapped prompt may include database structure information or database schema such as for example described herein. Embodiments may then generate, using a machine learning model such as for example an LLM, a query based on the wrapped prompt, wherein the query includes or describes a plurality of database operations such as for example described herein (step 1920). Embodiments may then extract a plurality of data or information items from a database or repository based on the query (step 1930), e.g. by searching the database using the query, and perform additional automated actions or operations such as for example further discussed herein.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A computerized method for automatic generation of database queries, the method comprising, using a computer processor:
   wrapping a free text prompt, the free text prompt received from a remote computer system using a representational state transfer (REST) protocol, wherein the wrapped prompt includes database structure information, wherein the wrapping of the free text prompt comprises embedding the free text prompt in a first predefined string of a plurality of predefined strings, the first predefined string describing one or more of: table names, and column names;
   generating, by a first large language model (LLM), a database query based on the wrapped prompt, the database query describing one or more database operations;
   wrapping the database query, wherein the wrapped database query includes one or more instructions, the instructions corresponding to one or more of the database operations, wherein the wrapping of the database query comprises embedding the database query in a second predefined string of the plurality of predefined strings, the second predefined string including a text format representation of a chart's axis names and a chart's type;
   generating, by a second LLM, one or more metadata items based on the wrapped database query:
   extracting one or more data items from a database based on the database query; and
   automatically plotting a chart on a user interface (UI) based on one or more of the extracted data items and one or more of the metadata items.

2. The computerized method of claim 1, comprising:
   calculating a count value based on the query; and
   if the query includes one or more stop commands, or the count value is larger than a threshold, transmitting an alert to a remote computer.

3. The computerized method of claim 1, wherein the query includes one or more structured query language (SQL) commands.

4. The computerized method of claim 1, comprising:
   selecting and executing a computer process based on one or more of the extracted data items.

5. The computerized method of claim 1, wherein one or more of the database operations include at least one of: an identification of a chart type, and an identification of one or more axes.

6. The computerized method of claim 1, comprising generating a create table prompt based on the wrapped prompts, wherein the create table prompt is input to the LLM for creating a table based on the query.

7. The computerized method of claim 1, wherein the text prompt describes a plurality of user actions input to a computer, the user actions collected by a desktop data collection software.

8. A computerized system for automatic generation of database queries, the system comprising:
   a memory,
   and a computer processor configured to:
   wrap a free text prompt, the free text prompt received from a remote computer system using a representational state transfer (REST) protocol, wherein the wrapped prompt includes database structure information, wherein the wrapping of the free text prompt comprises embedding the free text prompt in a first predefined string of a plurality of predefined strings, the first predefined string describing one or more of: table names, and column names;
   generate, by a first large language model (LLM), a database query based on the wrapped prompt, the database query describing one or more database operations;
   wrap the database query, wherein the wrapped database query includes one or more instructions, the instructions corresponding to one or more of the database operations, wherein the wrapping of the database query comprises embedding the database query in a second predefined string of the plurality of predefined strings, the second predefined string including a text format representation of a chart's axis names and a chart's type:

generate, by a second LLM, one or more metadata items based on the wrapped database query;

extract one or more data items from a database based on the database query; and automatically plot a chart on a user interface (UI) based on one or more of the extracted data items and one or more of the metadata items.

9. The computerized system of claim 8, wherein the processor is to:

calculate a count value based on the query; and if the query includes one or more stop commands, or the count value is larger than a threshold, transmit an alert to a remote computer.

10. The computerized system of claim 8, wherein the query includes one or more structured query language (SQL) commands.

11. The computerized system of claim 8, wherein the processor is to select and execute a computer process based on one or more of the extracted data items.

12. The computerized system of claim 8, wherein one or more of the database operations include at least one of: an identification of a chart type, and an identification of one or more axes.

13. The computerized system of claim 8, wherein the processor is to generate a create table prompt based on the wrapped prompts, wherein the create table prompt is input to the LLM for creating a table based on the query.

14. The computerized system of claim 8, wherein the text prompt describes a plurality of user actions input to a computer, the user actions collected by a desktop data collection software.

15. A computerized method for producing database queries, the method comprising, using a computer processor:

contextualizing a free text prompt, the free text prompt received from a remote computer system using a representational state transfer (REST) protocol, wherein the contextualized prompt includes database information, wherein the contextualizing of the free text prompt comprises embedding the free text prompt in a first predefined string of a plurality of predefined strings, the first predefined string describing one or more of: table names, and column names;

producing, by a first machine learning model, a database query based on the contextualized prompt, the database query including one or more database commands;

contextualizing the database query, wherein the contextualized database query includes one or more instructions, the instructions including one or more of the database commands, wherein the contextualizing of the database query comprises embedding the database query in a second predefined string of the plurality of predefined strings, the second predefined string including a text format representation of a chart's axis names and a chart's type;

producing, by a second machine learning model, one or more metadata items based on the contextualized database query:

output one or more data items from a database based on the query; and automatically generating a chart on a user interface (UI) based on one or more of the outputted data items and one or more of the metadata items.

\* \* \* \* \*